(12) United States Patent
Kang et al.

(10) Patent No.: US 11,698,720 B2
(45) Date of Patent: Jul. 11, 2023

(54) METHOD FOR CONNECTING MOBILE TERMINAL AND EXTERNAL DISPLAY AND APPARATUS IMPLEMENTING THE SAME

(71) Applicant: Samsung Electronics Co., Ltd., Suwon-si (KR)

(72) Inventors: Doyoun Kang, Hwaseong-si (KR); Sungjin Park, Suwon-si (KR); Gwanglim Lee, Seongnam-si (KR); Sangjin Lee, Ansan-si (KR); Boram Park, Yongin-si (KR); Soochan Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/732,839

(22) Filed: Jan. 2, 2020

(65) Prior Publication Data
US 2020/0142566 A1    May 7, 2020

Related U.S. Application Data

(63) Continuation of application No. 14/022,760, filed on Sep. 10, 2013, now abandoned.

(Continued)

(30) Foreign Application Priority Data

Sep. 20, 2012 (KR) .................. 10-2012-0104794
Sep. 20, 2012 (KR) .................. 10-2012-0104823
Jan. 11, 2013 (KR) .................. 10-2013-0003465

(51) Int. Cl.
*G06F 3/04842* (2022.01)
*H04W 8/24* (2009.01)
(Continued)

(52) U.S. Cl.
CPC ........ *G06F 3/04842* (2013.01); *G06F 3/1423* (2013.01); *H04M 1/72409* (2021.01);
(Continued)

(58) Field of Classification Search
CPC G06F 3/04842; G06F 3/1423; H04M 1/7253; H04M 1/72527; H04M 2250/16; H04W 8/24; G09G 5/14
See application file for complete search history.

(56) References Cited

U.S. PATENT DOCUMENTS 4,386,410 A    5/1983   Pandya et al.
4,437,093 A    3/1984   Bradley
(Continued)

FOREIGN PATENT DOCUMENTS

CA    2277610 A1    1/2000
CN    1591559 A     3/2005
(Continued)

OTHER PUBLICATIONS

Japanese Office Action dated Dec. 4, 2017, issued in Japanese Application No. 2013-187476.
(Continued)

*Primary Examiner* — Kieu D Vuz
*Assistant Examiner* — Alvaro R Calderon, IV
(74) *Attorney, Agent, or Firm* — Jefferson IP Law, LLP

(57) ABSTRACT

A method and apparatus for controlling desktop virtualization function, per-display device window layout provision function, and user input-based external display device utilization function are provided.

12 Claims, 27 Drawing Sheets

Related U.S. Application Data

(60) Provisional application No. 61/698,985, filed on Sep. 10, 2012, provisional application No. 61/698,909, filed on Sep. 10, 2012.

(51) Int. Cl.
  *G06F 3/14* (2006.01)
  *H04M 1/72409* (2021.01)
  *G09G 5/14* (2006.01)
  *H04M 1/72412* (2021.01)

(52) U.S. Cl.
  CPC .............. *H04W 8/24* (2013.01); *G09G 5/14* (2013.01); *H04M 1/72412* (2021.01); *H04M 2250/16* (2013.01)

(56) References Cited

U.S. PATENT DOCUMENTS

| | | | |
|---|---|---|---|
| 4,692,757 A | 9/1987 | Tsuhara et al. | |
| 5,517,209 A * | 5/1996 | Holland | G09G 5/14 715/788 |
| 5,726,669 A | 3/1998 | Obata et al. | |
| 6,072,476 A * | 6/2000 | Harada | G06F 3/14 345/204 |
| 6,252,607 B1 | 6/2001 | Babcock | |
| 6,300,947 B1 | 10/2001 | Kanevsky | |
| 6,327,623 B2 | 12/2001 | Watts | |
| 6,476,823 B1 * | 11/2002 | Gardner | G06F 3/0481 345/418 |
| 6,522,309 B1 | 2/2003 | Weber | |
| 6,983,424 B1 * | 1/2006 | Dutta | G06F 3/04817 715/790 |
| 7,779,367 B2 | 8/2010 | Oshiro et al. | |
| 7,870,496 B1 | 1/2011 | Sherwani | |
| 8,117,554 B1 * | 2/2012 | Grechishkin | G06F 9/451 715/764 |
| 8,296,728 B1 | 10/2012 | Webster | |
| 2002/0054172 A1 * | 5/2002 | Berman | G06F 3/0481 715/856 |
| 2002/0109725 A1 * | 8/2002 | Suzuki | G06F 3/1431 715/769 |
| 2003/0025678 A1 * | 2/2003 | Lee | G09G 5/08 345/173 |
| 2003/0067489 A1 | 4/2003 | Candy Wong et al. | |
| 2003/0076340 A1 * | 4/2003 | Hatori | G09G 5/14 345/699 |
| 2003/0222917 A1 | 12/2003 | Trantow | |
| 2004/0049574 A1 | 3/2004 | Watson et al. | |
| 2004/0080539 A1 * | 4/2004 | Kunisada | G09G 5/14 715/781 |
| 2004/0085343 A1 * | 5/2004 | Jackson | G06F 3/1423 715/726 |
| 2004/0233930 A1 | 11/2004 | Colby, Jr. | |
| 2005/0022135 A1 * | 1/2005 | de Waal | G09G 5/14 715/788 |
| 2005/0057434 A1 | 3/2005 | Youn | |
| 2005/0091610 A1 | 4/2005 | Frei et al. | |
| 2006/0069797 A1 | 3/2006 | Abdo et al. | |
| 2006/0150120 A1 | 7/2006 | Dresti et al. | |
| 2006/0230156 A1 | 10/2006 | Shappir et al. | |
| 2006/0267857 A1 | 11/2006 | Zhang et al. | |
| 2006/0284785 A1 | 12/2006 | Bitterlich | |
| 2007/0101297 A1 | 5/2007 | Forstall et al. | |
| 2007/0124685 A1 | 5/2007 | Guillermo et al. | |
| 2007/0124737 A1 | 5/2007 | Wensley et al. | |
| 2007/0130541 A1 | 6/2007 | Louch et al. | |
| 2007/0157101 A1 | 7/2007 | Indiran et al. | |
| 2007/0182853 A1 * | 8/2007 | Nishikawa | H04N 21/4122 348/554 |
| 2007/0243907 A1 | 10/2007 | Jin et al. | |
| 2007/0266335 A1 | 11/2007 | Zielinski et al. | |
| 2007/0271525 A1 | 11/2007 | Han et al. | |
| 2007/0273648 A1 | 11/2007 | Fussinger | |
| 2007/0300188 A1 * | 12/2007 | Kim | H04N 5/44513 715/835 |
| 2008/0140886 A1 * | 6/2008 | Izutsu | H04M 1/72409 710/69 |
| 2008/0307315 A1 | 12/2008 | Sherman et al. | |
| 2009/0055758 A1 * | 2/2009 | Sim | G06F 9/451 715/762 |
| 2009/0058885 A1 * | 3/2009 | Park | G06F 3/04845 345/660 |
| 2009/0061841 A1 * | 3/2009 | Chaudhri | H04M 1/72409 455/420 |
| 2009/0109244 A1 * | 4/2009 | Conner | G06F 9/451 345/660 |
| 2009/0125586 A1 | 5/2009 | Sato et al. | |
| 2009/0207097 A1 | 8/2009 | Sherman et al. | |
| 2009/0222761 A1 * | 9/2009 | Hayashi | G06F 9/451 715/781 |
| 2009/0248802 A1 | 10/2009 | Mahajan et al. | |
| 2009/0254854 A1 * | 10/2009 | Adams | G06F 3/048 715/800 |
| 2009/0282359 A1 | 11/2009 | Saul et al. | |
| 2009/0292999 A1 | 11/2009 | Labine et al. | |
| 2010/0050111 A1 | 2/2010 | Duffy | |
| 2010/0060572 A1 | 3/2010 | Tsern | |
| 2010/0093399 A1 * | 4/2010 | Kim | H04M 1/0202 455/566 |
| 2010/0097637 A1 * | 4/2010 | Gha | H04N 1/00931 358/1.15 |
| 2010/0099456 A1 * | 4/2010 | Kim | G06F 3/0346 455/556.1 |
| 2010/0115458 A1 | 5/2010 | Marano et al. | |
| 2010/0122184 A1 | 5/2010 | Vonog et al. | |
| 2010/0138780 A1 | 6/2010 | Marano et al. | |
| 2010/0211886 A1 | 8/2010 | Forstall et al. | |
| 2010/0223563 A1 | 9/2010 | Green | |
| 2010/0250816 A1 * | 9/2010 | Collopy | G06F 1/1632 345/173 |
| 2010/0257450 A1 | 10/2010 | Go et al. | |
| 2010/0257471 A1 | 10/2010 | Ang et al. | |
| 2010/0257482 A1 | 10/2010 | Lyons et al. | |
| 2010/0261507 A1 * | 10/2010 | Chang | H04L 67/10 455/566 |
| 2010/0262673 A1 * | 10/2010 | Chang | H04L 67/141 715/764 |
| 2010/0281363 A1 | 11/2010 | Inaba | |
| 2010/0293504 A1 | 11/2010 | Hachiya | |
| 2010/0295795 A1 | 11/2010 | Wilairat | |
| 2010/0299436 A1 * | 11/2010 | Khalid | G06F 3/04886 709/226 |
| 2010/0313165 A1 * | 12/2010 | Louch | G06F 9/451 715/792 |
| 2011/0004839 A1 * | 1/2011 | Cha | G06F 9/451 715/765 |
| 2011/0025719 A1 | 2/2011 | Yanase | |
| 2011/0037711 A1 | 2/2011 | Siddiqui et al. | |
| 2011/0050975 A1 * | 3/2011 | Chung | G06F 1/1624 345/1.3 |
| 2011/0060623 A1 * | 3/2011 | Neureuter | G06F 3/0486 715/769 |
| 2011/0066971 A1 | 3/2011 | Forutanpour et al. | |
| 2011/0082938 A1 | 4/2011 | Jaudon et al. | |
| 2011/0126142 A1 | 5/2011 | Zhou et al. | |
| 2011/0126156 A1 * | 5/2011 | Krishnaraj | G06F 3/04845 345/629 |
| 2011/0157014 A1 * | 6/2011 | Hachiya | G06F 3/0486 345/157 |
| 2011/0205435 A1 * | 8/2011 | Lee | H04N 5/44543 348/563 |
| 2011/0219331 A1 | 9/2011 | Deluca et al. | |
| 2011/0246904 A1 | 10/2011 | Pinto et al. | |
| 2011/0265009 A1 * | 10/2011 | Eby | G06F 3/1454 715/740 |
| 2011/0275391 A1 * | 11/2011 | Lee | H04W 16/20 455/500 |
| 2011/0304557 A1 | 12/2011 | Wilburn et al. | |
| 2012/0005269 A1 | 1/2012 | Janssen et al. | |

(56) References Cited

U.S. PATENT DOCUMENTS

| | | | |
|---|---|---|---|
| 2012/0017163 A1* | 1/2012 | Ragan | G06F 3/0481 |
| | | | 715/765 |
| 2012/0023157 A1 | 1/2012 | Roth et al. | |
| 2012/0030584 A1* | 2/2012 | Bian | G06F 9/451 |
| | | | 715/746 |
| 2012/0038541 A1* | 2/2012 | Song | G06F 3/1423 |
| | | | 345/1.1 |
| 2012/0038679 A1 | 2/2012 | Yun et al. | |
| 2012/0040719 A1* | 2/2012 | Lee | G09G 3/2092 |
| | | | 455/557 |
| 2012/0040720 A1* | 2/2012 | Zhang | H04M 1/7253 |
| | | | 455/557 |
| 2012/0050183 A1 | 3/2012 | Lee | |
| 2012/0060109 A1 | 3/2012 | Han et al. | |
| 2012/0062549 A1 | 3/2012 | Woo et al. | |
| 2012/0081354 A1* | 4/2012 | Yusupov | H04L 69/32 |
| | | | 345/418 |
| 2012/0086716 A1* | 4/2012 | Reeves | G06F 3/1431 |
| | | | 345/522 |
| 2012/0088548 A1 | 4/2012 | Yun et al. | |
| 2012/0089992 A1 | 4/2012 | Reeves et al. | |
| 2012/0092277 A1 | 4/2012 | Momchilov | |
| 2012/0102549 A1 | 4/2012 | Mazzaferri et al. | |
| 2012/0169765 A1 | 7/2012 | Xu et al. | |
| 2012/0172088 A1* | 7/2012 | Kirch | G06F 3/14 |
| | | | 455/557 |
| 2012/0198386 A1 | 8/2012 | Hautala | |
| 2012/0206372 A1 | 8/2012 | Mundt et al. | |
| 2012/0226985 A1 | 9/2012 | Chervets et al. | |
| 2012/0274656 A1 | 11/2012 | Kang et al. | |
| 2012/0299846 A1 | 11/2012 | Matsuda | |
| 2012/0299967 A1* | 11/2012 | Urabe | G09G 5/14 |
| | | | 345/660 |
| 2013/0012320 A1* | 1/2013 | Bellinghausen | G06F 3/04886 |
| | | | 345/163 |
| 2013/0016048 A1 | 1/2013 | So et al. | |
| 2013/0019183 A1 | 1/2013 | Reeves et al. | |
| 2013/0063455 A1* | 3/2013 | Bayer | G06F 3/04842 |
| | | | 345/522 |
| 2013/0076592 A1* | 3/2013 | Reeves | G06F 1/1647 |
| | | | 345/1.3 |
| 2013/0076594 A1* | 3/2013 | Sirpal | G09G 5/14 |
| | | | 345/1.3 |
| 2013/0076780 A1 | 3/2013 | Reeves et al. | |
| 2013/0076782 A1* | 3/2013 | Sirpal | H05K 13/00 |
| | | | 345/1.3 |
| 2013/0088452 A1* | 4/2013 | Glaser-Seidnitzer | |
| | | | A61B 34/25 |
| | | | 345/173 |
| 2013/0109371 A1 | 5/2013 | Brogan et al. | |
| 2013/0120276 A1 | 5/2013 | Kim et al. | |
| 2013/0125009 A1 | 5/2013 | Deluca et al. | |
| 2013/0127734 A1* | 5/2013 | Dowd | G06F 3/0488 |
| | | | 345/173 |
| 2013/0132885 A1 | 5/2013 | Maynard et al. | |
| 2013/0159917 A1* | 6/2013 | Loebach | G06F 3/0488 |
| | | | 715/778 |
| 2013/0214996 A1* | 8/2013 | Reeves | H04N 21/4438 |
| | | | 345/1.3 |
| 2013/0222273 A1 | 8/2013 | Tan | |
| 2013/0241896 A1* | 9/2013 | Ishitsuka | G06F 9/451 |
| | | | 345/178 |
| 2013/0286042 A1* | 10/2013 | Ikeda | G06F 3/04842 |
| | | | 345/619 |
| 2014/0002389 A1* | 1/2014 | Kim | G06F 3/1454 |
| | | | 345/1.3 |
| 2014/0006988 A1* | 1/2014 | Yamamura | G06F 3/0482 |
| | | | 715/765 |
| 2014/0136986 A1 | 5/2014 | Martin et al. | |
| 2014/0201803 A1 | 7/2014 | Patil et al. | |
| 2014/0203999 A1 | 7/2014 | Shim | |

FOREIGN PATENT DOCUMENTS

| | | |
|---|---|---|
| CN | 1886717 A | 12/2006 |
| CN | 101060615 A | 10/2007 |
| CN | 101222710 A | 7/2008 |
| CN | 101916186 A | 12/2010 |
| CN | 102037440 A | 4/2011 |
| CN | 102073448 A | 5/2011 |
| CN | 102291477 A | 12/2011 |
| CN | 102402379 A | 4/2012 |
| CN | 102541768 A | 7/2012 |
| EP | 2242240 A1 | 10/2010 |
| EP | 2 428 947 A2 | 3/2012 |
| EP | 2428947 A3 | 5/2012 |
| FR | 2966312 A1 | 4/2012 |
| JP | 2002-140471 A | 5/2002 |
| JP | 2002-149338 A | 5/2002 |
| JP | 2009-140471 A | 6/2009 |
| JP | 2010-009533 A | 1/2010 |
| JP | 2010-267142 A | 11/2010 |
| JP | 2012-108719 A | 6/2012 |
| JP | 2013-033303 A | 2/2013 |
| WO | 2011/135352 A1 | 11/2011 |
| WO | 2012/020865 A1 | 2/2012 |

OTHER PUBLICATIONS

European Search Report dated Jun. 4, 2018, issued in European Application No. 18161693.9-1216.
Japanese Notice of Allowance dated Jan. 9, 2019; Japanese Patent Application 2013-187476.
"Android-Supporting Multiple Screens." Nov. 2, 2010. https://web.archive.org/web/201 011 02082327/http://developer.android.com/guide/practices/screens_support.html (Year: 2010).
"Mobile PC", Feb. 8, 2011, https://web.archive.org/web/20110226173423/http://msdn.microsoft.com:80/enus/library/dd302492(v=VS.85).aspx.
Non-Final Office Action dated Jan. 29, 2016, issued in U.S. Appl. No. 14/022,760.
Non-Final Office Action dated Mar. 23, 2017, issued in U.S. Appl. No. 14/022,760.
Final Office Action dated Sep. 7, 2017, issued in U.S. Appl. No. 14/022,760.
Non-Final Office Action dated Mar. 19, 2018, issued in U.S. Appl. No. 14/022,760.
Final Office Action dated Jul. 12, 2019, issued in U.S. Appl. No. 14/022,760.
Non-Final Office Action dated Oct. 3, 2019, issued in U.S. Appl. No. 14/022,760.
Chinese Office Action dated Dec. 1, 2020, issued in Chinese Application No. 201810689853.9.
Chinese Office Action dated Dec. 15, 2020, issued in Chinese Application No. 201810688583.X.
Extended European Search Report dated Jul. 6, 2021, issued in European Application No. 21169353.6-1216.
Chinese Notification of a Decision to Grant a Patent dated Sep. 1, 2021, issued in Chinese Application No. 201810689853.9.
Chinese Notification of a Decision to Grant a Patent dated Sep. 28, 2021, issued in Chinese Application No. 201810688583.X.
Indian Office Action dated Aug. 24, 2022; Indian Appln. No. 202238011404.
European Communication dated Oct. 31, 2022; European Appln. No. 2 169 353.6-1224.
Extended European Search Report dated Feb. 22, 2023; European Appln. No. 22209753.7-1224.
U.S. Office Action dated Dec. 23, 2022; U.S. Appl. No. 17/671,020.
U.S. Office Action dated Apr. 3, 2023; U.S. Appl. No. 17/671,020.

* cited by examiner

METHOD FOR CONNECTING MOBILE TERMINAL AND EXTERNAL DISPLAY AND APPARATUS IMPLEMENTING THE SAME

CROSS-REFERENCE TO RELATED APPLICATION(S)

This application is a continuation application of prior application Ser. No. 14/022,760 filed on Sep. 10, 2013, which claims the benefit under 35 U.S.C. § 119(e) of a U.S. Provisional application filed on Sep. 10, 2012 in the U.S. Patent and Trademark Office and assigned Ser. No. 61/698,909 and a U.S. Provisional application filed on Sep. 10, 2012 in the U.S. Patent and Trademark Office and 61/698,985, and under 35 U.S.C. § 119(a) of a Korean patent application filed on Sep. 20, 2012 in the Korean Intellectual Property Office and assigned Serial No. 10-2012-0104794, a Korean patent application filed on Sep. 20, 2012 in the Korean Intellectual Property Office and assigned Serial No. 10-2012-0104823, and a Korean patent application filed on Jan. 11, 2013 in the Korean Intellectual Property Office and assigned Serial No. 10-2013-0003465, the entire disclosures which are hereby incorporated by reference.

TECHNICAL FIELD

The present disclosure relates to a function execution method and apparatus of a mobile terminal. More particularly, the present disclosure relates to a method and apparatus for managing a connection between a mobile terminal and an external display apparatus.

BACKGROUND

The present disclosure is applicable to Orthogonal Frequency Division Multiple Access (OFDMA) system such as 3$^{rd}$ Generation Partnership Project Long Term Evolution (3GPP LTE) and other similar systems.

With the advance of digital technologies, various types of mobile terminals capable of communicating and processing data (e.g., cellular communication terminal, Personal Digital Assistant (PDA), electronic organizer, smartphone, tablet Personal Computer (PC), and the like) are emerging. Recently, the mobile terminals are evolving into multifunctional devices integrating various functions in line with the mobile convergence tendency. For example, a recent mobile terminal integrates various functions including voice and video telephony function, a messaging function including Short Message Service (SMS) Multimedia Message Service (MMS), and email, a navigation function, a document editing (e.g., memo and word processor) function, a picture capture function, a broadcast playback function, a multimedia (e.g., video and audio) playback function, an Internet access function, a messenger function, a Social Networking Service (SNS) function, and/or the like.

The recent mobile terminal supports the external output function capable of connecting to an external display device (e.g., Liquid Crystal Display (LCD) monitor) to display the data of the mobile terminal thereon. If the external display device is connected to the mobile terminal, the mobile terminal transfers the terminal's screen to the external display device (e.g., when the mobile terminal operates in clone mode). In addition, the mobile terminal may transfer only the execution screen (e.g., video data according to the motion picture playback) of a certain function (or application) which is currently running on the mobile terminal (e.g., when the mobile terminal operates in video only mode).

However, the aforementioned methods have a drawback in that when an external display device is connected to the mobile terminal, efficiently utilizing the screens different in size is difficult. For example, the methods according to the related art are limited in function to the clone mode and video only mode.

In addition, the methods according to the related art support only one layout related to the screen displayed by the mobile terminal such that the external display device displays the screen in the same layout as the mobile terminal. Accordingly, the method according to the related art merely enlarges the same layout to fit for the screen size of the external display device. As described above, the method according to the related art has a drawback in that when the mobile terminal is connected to an external display device, efficiently using the displays different in size is difficult.

In addition, the dual display system according to the related art has a drawback in cost due to the requirement of extra external input device. Of course, the external input device may be replaced by the input unit of the mobile terminal. However, in the case that the input unit of the mobile terminal is a touchscreen, using the touchscreen for controlling the external display device is difficult.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a desktop virtualization method and apparatus of a mobile terminal that is capable of operation in the desktop environment through the mobile terminal interoperating with an external display device.

An aspect of the present disclosure is to provide a desktop virtualization method and apparatus of a mobile terminal that is capable of implementing a desktop window environment through an external display device in a single system of the mobile terminal.

Another aspect of the present disclosure is to provide a desktop virtualization method and apparatus of a mobile terminal that is capable of supporting large amount of information and various user experiences for the user.

Another aspect of the present disclosure is to provide an intelligent service provision method and apparatus that is capable of improving user convenience and mobile terminal usability by implementing optimal environment for supporting the desktop window environment in the mobile terminal.

Another aspect of the present disclosure is to provide per-display device window layout provision method and apparatus of a mobile terminal that is capable of displaying distinct screens with different window layouts.

Another aspect of the present disclosure is to provide a per-display device window layout provision method and apparatus of a mobile terminal that is capable of supporting different window layout screens for the distinct display devices.

Another aspect of the present disclosure is to provide a per-display device window layout provision method and apparatus of a mobile terminal that is capable of supporting screen displays with different window layouts for distinct display devices according to the display device outputting an execution screen of an application running on the mobile terminal.

Another aspect of the present disclosure is to provide a per-display device window layout provision method and apparatus of a mobile terminal that is capable of providing the user with various window layouts corresponding to different display devices and supporting display of various information according to the screen sizes of the display devices.

Another aspect of the present disclosure is to provide a per-display device window layout provision method and apparatus of a mobile terminal that is capable of improving user convenience and mobile terminal usability by implementing optimal environment for supporting screen displays most appropriate for the respective displays especially when an application is running on the mobile terminal.

Another aspect of the present disclosure is to provide a method for providing a mobile terminal user with a dual display mode using an external display device without extra external input device.

Another aspect of the present disclosure is to provide a method for providing a mobile terminal user with a dual display mode using a touch screen of the mobile terminal and an external display device.

In accordance with an aspect of the present disclosure, a function control method using a mobile terminal and an external display device is provided. The function control method includes detecting a connection of the external display device, outputting a default desktop window screen to the external display device, receiving a control input, controlling, when the control input is an external input for controlling a desktop region of the external display device, a screen display of the desktop region, and controlling, when the control input is an internal input for controlling a default region of the mobile terminal, a screen display of the default region.

In accordance with another aspect of the present disclosure, a function control method using a mobile terminal and an external display device is provided. The function control method includes detecting a connection between the mobile terminal and the external display device, executing a desktop mode, displaying a default desktop window screen for the desktop mode through the external display device, and controlling a desktop virtualization function in a desktop window environment through the external display device.

In accordance with another aspect of the present disclosure, a mobile terminal is provided. The mobile terminal includes an interface unit configured to provide at least one of wired and wireless interface for connection of an external display device and an external input device, a touchscreen configured to display a window screen having a layout for a default region of the mobile terminal and a virtual input device for desktop environmental control of a desktop region of the external display device and to receive a control input using the virtual input device, and a controller configured to control desktop virtualization for displaying, when interoperating with the external display device, data and application generated in the mobile terminal in correspondence to the desktop environment through the external display apparatus and processing operations.

In accordance with another aspect of the present disclosure, a non-transitory computer-readable storage medium is provided. The non-transitory computer-readable storage medium is recorded with a program that, when executed, causes at least one processor to perform a method including executing, when a mobile terminal is connected to an external display device, a desktop mode, displaying a default desktop window screen for the desktop mode through the external display device, and controlling a desktop virtualization function in a desktop window environment through the external display device.

In accordance with another aspect of the present disclosure, a screen display method using a mobile terminal and an external display device is provided. The screen display method includes detecting a window creation event occurring with execution of an application, determining a display device for displaying a window in response to the window creation event, acquiring resource of the display device for displaying the window, determining a window layout policy of the display device corresponding to the acquired resource, creating the window on the display device in a layout according to the determined window layout policy, and displaying an execution screen of the application through the window.

In accordance with another aspect of the present disclosure, a screen display method using a mobile terminal and an external display device is provided. The screen display method includes acquiring, at the mobile terminal when the external device is connected, resource of the external display device, determining a window layout policy corresponding to the acquired resource, outputting a desktop window screen determined according to the window layout policy to the external display device, displaying, at the external display device, the desktop window screen according to the window layout policy, determining, at the mobile terminal when a user input for execution an application is detected, a window creation region for the application, determining, when the window creation region is the external display device, the window layout policy for the external display device, outputting an application execution screen according to the determined window layout policy to the external display device, and displaying, at the external display device, the application execution screen in the layout according to the window layout policy.

In accordance with another aspect of the present disclosure, a method for providing a window layout per display device is provided. The method includes configuring window layout policies for display devices, determining, when a window is created in response to an application execution request, the window layout policy to be applied to the window, and creating the window in a layout according to the determined window layout policy.

In accordance with another aspect of the present disclosure, a system for displaying a screen according to per-display device layout policies is provided. The system includes a mobile terminal which supports multi-screen function in connection with an external display device and which outputs a window formatted according to the window layout policy corresponding to a resource of the connected external display device and an external display device which displays the window output by the mobile terminal in the layout according to the window layout policy.

In accordance with another aspect of the present disclosure, a mobile terminal is provided. The mobile terminal includes an interface unit configured to provide at least one of wired and wireless interfaces for connection of an external display device, a display unit configured to display a screen according to a preconfigured window layout policy, and a controller configured to configure window layout policies of display devices, to determine, when creating a window in response to an application execution request, the window layout policy to be applied to the window according to the preconfigured window layout policy, to create the window in a layout according to the window layout policy, and to control the external display device to display the window.

In accordance with another aspect of the present disclosure, a non-transitory computer-readable storage medium is provided. The non-transitory computer-readable storage medium is recorded with a program that, when executed, causes at least one processor to perform a method including detecting a window creation event occurring with execution of an application, determining a display device for displaying a window in response to the window creation event, acquiring resource of the display device for displaying the window, determining a window layout policy of the display device corresponding to the acquired resource, creating the window on the display device in a layout according to the determined window layout policy, and displaying an execution screen of the application through the window.

In accordance with another aspect of the present disclosure, a method for processing a user input made on a mobile terminal equipped with a touchscreen and connected to an external display device is provided. The method includes detecting the user input on the touchscreen, determining whether the user input is related to a first screen of the external display device, and performing, when the user input is related to the first screen, a function related to the first screen in response to the user input and, when the user input is not related to the first screen, a function related to a second screen of the touchscreen in response to the user input.

In accordance with still another aspect of the present disclosure, a mobile terminal is provided. The mobile terminal includes an interface unit configured to connect to an external display device through a wired link, a radio communication unit configured to connect to the external display device through a wireless link, a touchscreen including a touch panel and a display panel, and a controller configured to control the interface unit, the radio communication unit, and the touchscreen, wherein the controller detects a user input, determines whether the user input is related to a first screen of the external display device, and performs, when the user input is related to the first screen, a function related to the first screen in response to the user input and, when the user input is not related to the first screen, a function related to a second screen of the touchscreen in response to the user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
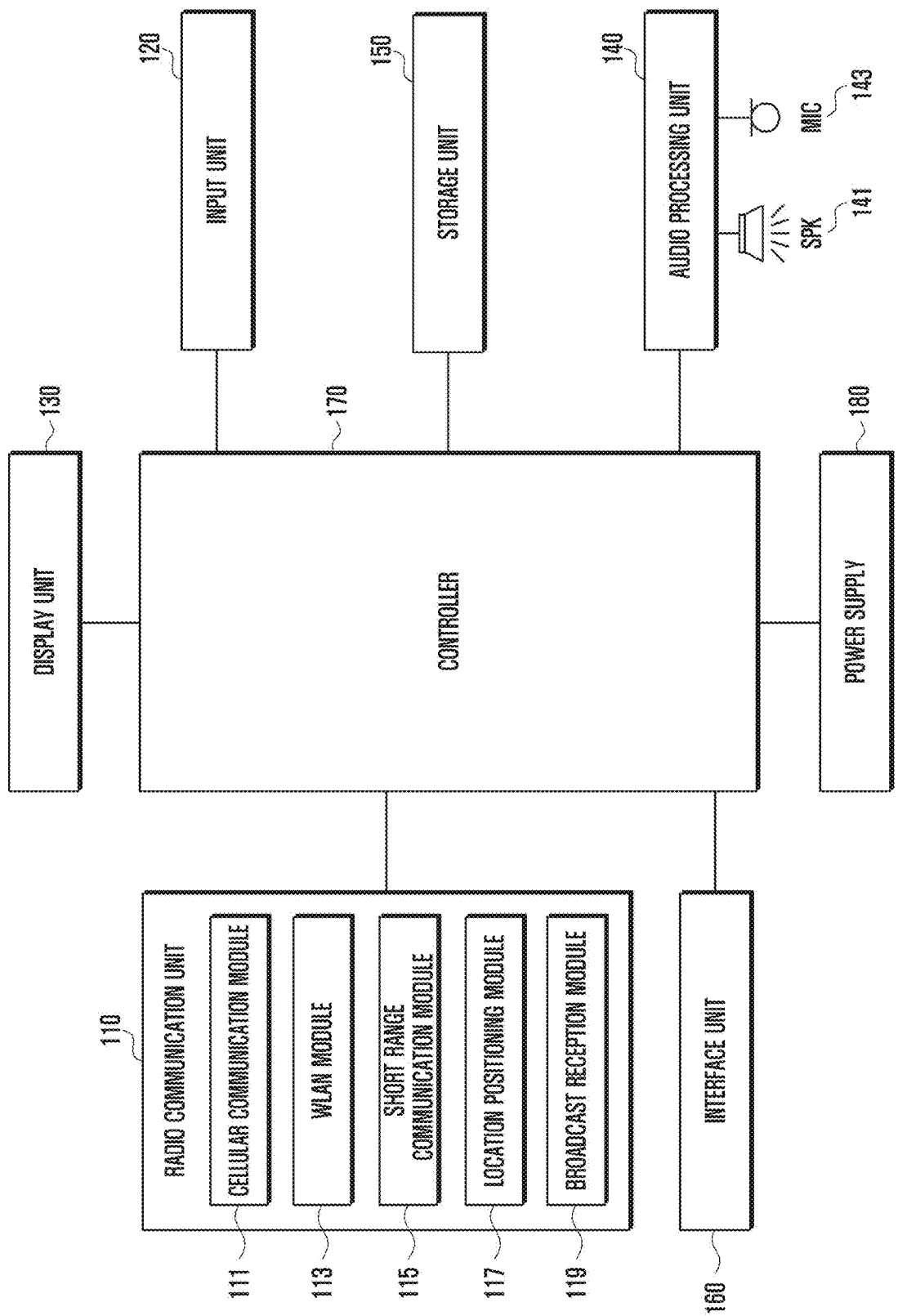
FIG. 1 is a schematic diagram illustrating a configuration of a mobile terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method and apparatus for implementing desktop virtualization of a mobile terminal. According to various embodiments of the present disclosure, the desktop virtualization is capable of allowing the mobile terminal interoperating an external display device to render the data and application processed thereby to fit for the desktop window environment corresponding to the external display device.

In the following description, the mobile terminal may be any of all the types of information communication devices, multimedia devices, and equivalents thereof using an Application Process (AP), a Graphic Processing Unit (GPU), and a Central Processing Unit (CPU). For example, the mobile terminal may be any of cellular communication terminal operating with various communication protocols corresponding to the communication systems, a tablet Personal Computer (PC), a smartphone, a digital camera, a Portable Multimedia Player (PMP), a Media Player (e.g., MP3 player), a handheld e-book, a portable game console, a Personal Digital Assistant (PDA), and the like. In addition, according to various embodiments of the present disclosure, the gesture-based control method may be applied to various display devices such as a digital television (TV), Digital Signage (DS), and a Large Format Display (LFD), a laptop computer, and a desktop computer, and/or the like.

Various embodiments of the present disclosure may be implemented with the mobile terminal supporting connection to an external display device and the external device displaying a desktop window environment. Various embodiments of the present disclosure may further include an input device (e.g., a wired/wireless keyboard, an external mouse, and/or the like) capable of manipulating windows presented on the external display device connected to the mobile terminal.

Various embodiments of the present disclosure relate to a per-display device window layout provision method and apparatus of a mobile terminal that are capable of displaying screens having different layouts for respective display devices. Particularly according to various embodiments of the present disclosure, when at least one external display device is connected to the mobile terminal, the execution screen of the same application is displayed in window different layouts for the mobile terminal's display unit and the external display device.

According to various embodiments of the present disclosure, differentiating among display devices based on the respective resources thereof (e.g., device type and screen size) is possible and configuring a window layout policy per display device is possible. According to various embodiments of the present disclosure, the window layout policy may be the information for determining the window layout of the execution screen depending on the resource (particularly, screen size) of the display device.

The display method according to various embodiments of the present disclosure may be implemented with a mobile terminal supporting multi-screen function and connection of external display device and an external display device for displaying the execution screen of an application running on the mobile terminal according to the window layout policy determined by the mobile terminal. Various embodiments of the present disclosure may include configuring a window layout policy per display device, determining a window layout per display device, and applying a window layout per display device according to the window layout policy.

For example, according to various embodiments of the present disclosure, the display method may distinguish among the display devices according to the resources of the display devices and configures window layout policy per display device regardless of the connection of the external display device to the mobile terminal. The window layout policy may be provided by a provider as default or defined diversely according to the user configuration. When a window is generated according to the execution of an application, determining the area of the display device for generating a window and determining the window layout policy of the display device on which the window is generated from the preconfigured per-display device window layout policy are possible. If the window layout policy for the display device exists, the corresponding window layout policy is applied and, otherwise no window layout policy for the display device exists, the default window layout policy is applied.

Hereinafter, a description is made of the configuration of the mobile terminal and control method thereof according to various embodiments of the present disclosure. The configuration of the mobile terminal and control method thereof according to various embodiments of the present disclosure is not limited to the following description but may be embodied with various modifications.

FIG. 1 is a schematic diagram illustrating a configuration of a mobile terminal according to an embodiment of the present disclosure.

Referring to FIG. 1, the mobile terminal 100 includes a radio communication unit 110, a user input unit 120, a display unit 130, an audio processing unit 140, a storage unit 150, an interface unit 160, a controller 170, and a power supply 180. According to various embodiments of the present disclosure, the mobile terminal 100 may be implemented with or without any of the components shown in FIG. 1. If the mobile terminal 100 supports image capturing function, the mobile terminal 100 may further include a camera module. If the mobile terminal 100 does not support the mobile communication function, a part of the radio communication unit 110 (e.g., cellular communication module) may be omitted.

The radio communication unit 110 may include at least one communication module capable of allowing the mobile terminal 100 to communicate with a radio communication system or a network to which another device is connected. For example, the radio communication unit 110 may include at least one of a cellular communication module 111, a Wireless Local Area Network (WLAN) module 113, a short range communication module 115, a location positioning module 117, and a broadcast reception module 119.

The mobile communication module 111 communicates radio signals with at least one of a base station, an external terminal, and various servers (e.g., integration server, a provider server, a content server, and/or the like). The radio signals may include various types of data for voice telephony, video conference, or text/multimedia messaging services. The cellular communication module 111 connects to at least one of the various servers to receive an application supporting at least one of mobile window environment and desktop window environment under the control of the controller 170.

According to various embodiments of the present disclosure, the mobile window environment is the environment in which the function (or application) execution screen is rendered to be fit for the window corresponding to the screen size of the display unit 130 of the mobile terminal 100. The desktop window environment is the environment in which the function (or application) execution screen of the mobile terminal 100 is rendered variously in size according to the screen size of the external display device for desktop environment operations.

Meanwhile, the cellular communication module 111 may connect to at least one of the various servers to receive the window layout policy for various display devices under the control of the controller 170.

The WLAN module 113 is the module for connecting wireless Internet and establishing a WLAN link with another mobile terminal. According to various embodiments of the present disclosure, the WLAN module 113 may be embedded in the mobile terminal 100 or attached as an external device. The WLAN module 113 may support at least one wireless internet technology among Wi-Fi, Wireless Broadband (WiBro), World Interoperability for Microwave Access (WiMAX), high Speed Downlink Packet Access (HSDPA), and the like. The WLAN module 113 may connect to at least one of the various servers to receive the application supporting at least one of the mobile window environment and desktop window environment according to the user's selection. When a WLAN link is established with another mobile terminal, the WLAN module 113 may transmit or receive the application selected by the user to and from the other mobile terminal.

The WLAN module connects to at least one of the various servers to receive the window layout policy for various display devices under the control of the controller 170. If a WLAN link is established with another mobile terminal, the WLAN module 113 may transmit or receive the per-display device window layout policies to and from the other mobile terminal according to the user's selection.

The short range communication module 115 is the module for short range communication. Examples of short range communication technologies include Bluetooth, Bluetooth Low Energy (BLE), Radio Frequency Identification (RFID), Infrared Data Association (IrDA), Ultra Wideband (UWB), ZigBee, Near Field Communication (NFC), and the like. The short range communication module 115 may establish a short range communication link with another mobile terminal to transmit or receive data to and from the other mobile terminal. According to various embodiments of the present disclosure, the short range communication module 115 may support connection of an external input device (e.g., Bluetooth, keyboard, mouse, and/or the like). When a short range communication link is established with another mobile terminal, the short range communication module 115 may transmit or receive per-display device window layouts to and from the other mobile terminal.

The location positioning module 117 is responsible for positioning the location of the user device, and Global Positioning System (GPS) module is one of the representative location positioning modules. The location positioning module 115 collects accurate distance and time information from at least three base stations and performs triangulation based on the acquired information to acquire 3-Dimentional (3D) location information with latitude, longitude, and altitude. The location positioning module 115 is also capable of calculating the location information based on the signals from three or more satellites in real time. The location information of the user device may be acquired using various methods.

The broadcast reception module 119 receives broadcast signals (e.g., TV broadcast signal, radio broadcast signal, and data broadcast signal) and/or information on the broadcast (e.g., broadcast channel information, broadcast program information, and broadcast service provider information) from an external broadcast management server through a broadcast channel (e.g., satellite broadcast channel, and terrestrial broadcast channel).

The input unit 120 generates an input signal for controlling the operation of the user device in response to the user input. The input unit 120 may include a key pad, a dome switch, a touch pad (capacitive/resistive), a jog wheel, a jog switch, and/or the like. The input unit 120 may be implemented with external buttons and/or virtual button on the touch panel.

According to various embodiments of the present disclosure, the input unit 120 may include a plurality of keys for receiving alphanumeric information and configuring various functions. The plurality of keys may include a menu key, a screen on/off key, a power on/off key, a volume control key, and/or the like. The input unit 120 generates key signal corresponding to the user configuration and function control key input to the controller 170. The key signal may include power on/off signal, volume control signal, and screen on/off signal. The controller 170 controls the components in response to the key signal. The keys of the input unit 120 are referred to as hard keys and the virtual keys presented on the display unit 130 are referred to as soft keys.

The display unit 130 displays (outputs) the information processed by the user device. For example, in the case that the user device is operating in a telephony mode, the display unit 130 displays a telephony User Interface (UI) or Graphic UI (GUI). In the case that the user device is operating in a video telephony mode or a picture shooting mode, the display unit 130 displays a UI or GUI displaying the picture taken by the camera or received through the communication channel. Particularly, the display unit 130 displays the execution screens of various functions (or applications) running on the mobile terminal 100. The display unit 130 presents a virtual input device (e.g., virtual touch pad) and generates a signal corresponding to the input made by means of the virtual input device to the controller 170. For example, the display unit 130 displays various execution screens of the mobile terminal 100 and may present the virtual input device screen according to the user's selection in the state that the execution screen is displayed.

The display unit 130 displays execution screens of various functions (or applications) running on the mobile terminal 100 according to the window layout policy. The display unit 130 is also capable of supporting display mode switching function for switching between portrait mode and landscape mode according to the rotation direction (or orientation) of the user device. The operation of the display panel 131 is described later with reference to screens.

The display unit 130 may be implemented with any of a Liquid Crystal Display (LCD), a Thin Film Transistor LCD (TFT LCD), a Light Emitting Diode (LED), an Organic LED (OLED), an Active Matrix OLED (AMOLED), a flexible display, a bended display, a 3-Dimensional (3D) display, and/or the like. The display unit 130 may be implemented as a transparent display panel through which the light penetrates.

In the case that the display unit 130 and the touch panel detecting touch gesture are layered (hereinafter, referred to as touchscreen), the display unit 130 may work as an input device as well as output device. The touch panel may be configured to convert change in pressure or capacitance at a specific region of the display unit 130 to an electric signal. The touch panel may be configured to detect the pressure of the touch as well as the touched position and size. If touch gesture is made on the touch panel, the corresponding signal(s) is generated to a touch controller (not shown). The touch controller (not shown) processes the signal(s) and generates corresponding data to the controller 170. The controller 170 is aware of the touched region.

As described above, the display unit 130 includes the touch panel and a display panel. The touch panel may be placed on the display panel of display unit. In detail, the touch panel may be implemented in add-on type in which the touch panel is placed on the display panel or in on-cell type or in-cell type in which the touch panel is embedded into display panel.

The touch panel generates an analog signal (e.g., touch event) in response to the user's touch gesture made on the display unit 130 and converts the analog signal to generate a digital to the controller 170. The touch event includes touch coordinates (x, y). For example, the touch panel determines some of the coordinates within the touch area (e.g., area touched by a user's finger or a pen) as the touch coordinates and sends the touch coordinates to the controller 170. The touch coordinates may be indicated by pixel. For example, if the screen resolution of the display unit 130 is 640*480, the X axis coordinate is in the range of 0 to 640 and the Y axis coordinate is in the range of 0 to 480. The touch panel may generate the touch signal including coordinates of the touched area to the controller 170. In this case, the controller 170 determines some of the received coordinates as the touch coordinates.

If the touch coordinates are received from the touch panel, the controller 170 determines that a touch tool (e.g., finger or pen) is in contact with the touch panel and, if no touch coordinate is received, that the touch has been released. In addition, if the coordinates are changed, (e.g., from $(x_1, y_1)$ to $(x_2, y_2)$), the controller 170 determines that the touch has moved. In response to the touch movement, the controller calculates the displacement $(d_x, d_y)$ and movement speed of the touch. The controller 170 determines the user gesture as one of touch, double touch, tap, double tap, long tap, tap & touch, drag, flick, press, pinch-in, and pinch-out, and/or the like based on the touch coordinates, whether the touch is applied or released, whether the touch moves, touch displacement, touch movement speed, and/or the like. The 'touch' is a user's gesture contacting a touch tool at a position on the touchscreen, the 'multi-touch' is the gesture of contacting the touch tool at least to positions (e.g., with thumb and index finger) on the touch screen, the 'tap' is the gesture of contacting a position on the screen with a touch tool and releasing the contact (touch-off) without moving the touch tool, the 'double tap' is the gesture of making the tap twice, the 'long tap' is the gesture of maintaining the contact for a long time as compared to the tab and then releasing the contact, the 'tap and touch' is the gesture of making a tap to a certain position and then making a touch at the same position in a predetermined time (e.g., 0.5 second), the 'drag' is the gesture of contacting a position and moving the contact on the screen in a certain direction, the 'flick' is a user's gesture of snapping on the screen quickly as compared to the drag gesture, the 'press' is a user's gesture of contacting at a certain position on the screen and applying press, the 'pinch-in' is the gesture of making two contact points with two touch tools and narrowing the distance between the two contact points, and the 'pinch-out' is the gesture of widening the distance between two contact points. For example, the 'touch' means the state of contacting the touch panel, and other gestures are changes in touched state. The touchscreen may be provided with a pressure sensor to detect the pressure at the touched position. The detected pressure information is sent to the controller 170 such that the controller 170 distinguishes between the touch and pressure based on the pressure information.

The touch panel may be implemented as a combined touch panel including a finger touch panel for detecting a gesture made by human body and a pen touch panel for detecting pen gesture made by a pen. The finger touch panel may be implemented as a capacitive type panel. The finger touch panel is capable of detecting the touch gesture made by a certain object (e.g., conductive material capable of changing electrostatic capacity) as well as human body. The pen touch panel may be implemented with an electromagnetic induction type panel. In this case, the pen touch panel generates a touch event in response to the gesture made by the touch stylus pen manufactured to generate magnetic field.

The display panel displays the image under the control of the controller 170. The controller 170 renders the data into an image and stores the image in a buffer. The display panel may display various images associated with the operation of the mobile terminal 100 (e.g., lock screen, home screen, application (or app) execution screen, keypad, and/or the like). If the mobile terminal powers on, the display unit 130 displays the lock screen. If a touch input or key input for unlock is detected, the controller changes the lock screen for the home screen or application execution screen. The home screen may include a background image and a plurality of icons arranged thereon. The icons correspond to the respective applications. If an icon is selected by the user (e.g., tap on an icon), the controller executes the corresponding application (e.g., browser) and displays the execution screen by means of the display unit 130. The display unit 130 may display the application execution screen as background and another image (e.g., keypad), on the foreground so as to be overlaid on the background. The display unit 130 displays a first image at the first region and the second image at the second region.

The audio processing unit 140 sends the audio signal received from the controller 170 to the speaker (SPK) 141 and sends the audio signal such as voice input through the microphone (MIC) 143 to the controller 170. The audio processing unit 140 is capable of processing the voice/sound data to output an audible sound wave through the speaker 141 and processing the audio signal including voice to generate a digital signal to the controller 170.

The speaker 141 is capable of outputting audio received by the radio communication unit 110 or stored in the storage unit 150 in the telephony mode, audio (video) recording mode, media content playback mode, broadcast reception mode, photo capture mode, and/or the like. The speaker 141 is also capable of output sound effects associated with the function executed in the mobile terminal (e.g., inbound call reception, outbound call placing, audio and video playback, photo shooting, and external output).

The microphone 143 is capable of processing the input acoustic signal to generate voice data in the telephony mode, audio (video) recording mode, speech recognition mode, photo capture mode, and/or the like. The processed voice data may be processed into the signal to be transmitted to the base station by means of the cellular communication module 111 in the telephony mode. The microphone 143 may be implemented with various noise cancellation algorithms to cancel the noise occurring in the audio signal input process.

The storage unit 150 may store programs associated with the processes and controls of the controller 170 and stores input/output data (e.g., phone number, message, multimedia contents including audio and video files, and applications) temporarily. The storage unit 150 may store the mobile terminal's function usage frequencies (e.g., application usage frequency, multimedia playback frequency, and phone number usage frequency, messaging frequency, and multimedia usage frequency, weight, priority, and preference). The storage unit 150 also may store the data associated with the various vibration patterns and sounds corresponding to the touch gestures made on the touchscreen. According to various embodiments of the present disclosure, the storage unit 150 may store various types of application for the desktop virtualization function, and the applications may be classified into the ones supporting the mobile window environment and the ones supporting desktop window environment. For example, certain applications performing the same operation may include a default mode application for outputting mobile window environment screen and a desktop mode application for outputting desktop window environment screen.

The storage unit 150 also stores the window layout policies for various types of display devices to provide window layout per display device. According to various embodiments of the present disclosure, the window layout policies may be mapped to the display devices by resource and stored in the form of a mapping table.

The storage unit 150 stores the booting program, Operating System (OS), middleware, and a virtual controller. According to various embodiments of the present disclosure, the virtual controller requests the OS to create a virtual touchscreen and controls the display unit 130 to display the execution screen corresponding to the virtual touchscreen. The kernel of the OS includes a U-input module. According to various embodiments of the present disclosure, the U-input module generates the virtual touchscreen in response to the request of the virtual controller, receives a touch event from the virtual controller, and sends the touch event to the virtual touchscreen. The middleware relay data between the OS and applications or between different types of applications. According to various embodiments of the present disclosure, an Xserver is a windows OS-based middleware to receive the user input (e.g., touch position displacement $(d_x, d_y)$) and transfers the received user input to the application associated with the external display device. Thereafter, the application performs a function corresponding to the user input (e.g., moves the pointer in proportion to the position displacement on the external display device).

The storage unit 130 is also capable of storing embedded applications and third party application. The embedded applications are the applications installed in the apparatus basically. The embedded applications may include browser, email, instant messenger, and the like. The third party applications are diverse applications that may be downloaded from the online market and installed in the terminal. The third party applications may be installed and uninstalled freely. If the mobile terminal powers on, the booting program is loaded on the main memory device (e.g., RAM) of the controller 170. The booting program loads the OS and middleware of the mobile terminal onto the main memory device. The OS loads the applications on the main memory device to execute.

The storage unit 150 may be implemented with a storage medium of at least one of a flash memory type, a hard disk type, a micro type, a card type (e.g., a Secure Digital (SD) type and an eXtream Digital (XD) card type) memories, a Random Access Memory (RAM), a Dynamic RAM (DRAM), a Static RAM (SRAM), a Read-Only Memory (ROM), a Programmable ROM (PROM), an Electrically Erasable PROM (EEPROM), a Magnetic RAM (MRAM), a magnetic disk, an optical disk type memories, and the like. The user device may interoperate with a web storage working as the storage unit 150 on the Internet.

The interface unit 160 provides the interface for the external devices connectable to the user device. The interface unit 160 is capable of transferring the data or power from the external devices to the internal components of the user device and transferring the internal data to the external devices. For example, the interface unit 160 may be provided with wired/wireless headset port, external charging port, wired/wireless data port, memory card slot, identity module slot, audio input/output port, video input/output port, earphone jack, and/or the like. According to various embodiments of the present disclosure, the interface unit 160 includes a data port for connection with at least one external display device through wired or wireless link. For example, the user interface 160 may include High-Definition Multimedia Interface (HDMI) (including standard, mini, and micro HDMIs) and/or Universal Serial Bus (USB) interface. When the mobile terminal 100 and the external display device are connected through WLAN (Wi-Fi) link, the WLAN may be included in the interface unit 160. When the mobile terminal 100 and the external input device are connected through a Bluetooth link, the Bluetooth may be included in the interface unit 160.

The controller 170 controls overall operations of the mobile terminal 100. For example, the controller 170 controls the operations associated with voice telephony, data communication, video conference, desktop virtualization, and external output. The controller 170 may include a multimedia module (not shown) for the desktop virtualization and external output. According to various embodiments of the present disclosure, the multimedia module (not shown) may be embedded in the controller 170 or implemented in separation from the controller 170.

According to various embodiments of the present disclosure, the controller 170 controls the operations for supporting the desktop virtualization. For example, the controller 170 controls the desktop virtualization in which the data generated at the mobile terminal 100 in the state of interoperation with the external display device 200 and the application are processed to be fit for the desktop environment of the external display device 200. For example, the controller 170 executes, when the mobile terminal 100 and the external display device 200 are connected, the desktop mode and controls such that the default desktop window screen for the desktop mode on the external display device 200. The controller 170 controls the window screen for the mobile terminal and the window screen for the external display device with different layouts in control of the desktop virtualization.

When the external display device 200 is connected, the controller 170 outputs the default desktop window screen to the external display device 200 and monitors to detect an input of control single in the desktop mode. If a control signal for controlling the desktop area of the external display device is input from outside, the controller 170 controls such that the desktop area is displayed on the screen. If the control signal is an internal signal for controlling the default area of the mobile terminal, the controller 170 controls the default area screen display.

When the external display device 200 is connected, the controller 170 may acquire the information on the screen size of the external display device 200. The information on the screen size of the external display device may be acquired in the form of polling of the mobile terminal 100 or push of the external device 200.

The controller 170 controls displaying of the window screen with a desktop environment layout through the external display device 200 and providing window size adjustment button(s) at the top frame of the window displayed on the desktop area of the external display device 200.

According to various embodiments of the present disclosure, the controller 170 controls the operations for supporting the functions. For example, the controller 170 controls such that the data and application of the mobile terminal 100 is displayed through the connected external display device 200 in the layout corresponding to the window layout policy configured through the external display device 200. The controller 170 controls the window screen displayed on the external display device 200 in separation from the window screen displayed on the mobile terminal 100.

According to various embodiments of the present disclosure, the controller 170 controls the operation associated with the configuration of the window layout policies for the display devices. When generating a window according to an application execution request, the controller 170 may determine the layout to be applied to the window according to a predetermined window layout policy. The controller 170 generates the window in the layout determined according to the window layout policy to the external display device 200.

The controller 170 may acquire the resources for the display devices and search for the resource per display device and window layout policy mapped to the resource when determining the window. Particularly, the controller 170 may acquire the resource for the external display device 200 in the way of polling of the mobile terminal 100 or push of the external display device.

According to various embodiments of the present disclosure, the controller 170 may include a main memory device for storing application programs and OS, cache memory for storing data to be written to or read from the storage unit 150, a CPU, and a GPU. The OS is responsible for interfacing between the hardware and programs and manages the computing resources such as CPU, GPU, main memory device, and auxiliary device. For example, the OS operates the mobile terminal 100, schedules tasks, and controls operations of the CPU and GPU. The OS is also responsible for controlling execution of application programs and managing data and file storage. As well-known in the art, the CPU may be the main control unit of the computer system which is responsible for data operation and comparison and command analysis and execution. The GPU is the graphic control unit for performing data operation and comparison and command analysis and execution in association with graphics instead of the CPU. The CPU and GPU may be integrated into a package as a single integrated circuit composed of two or more independent cores (e.g., quad-core). The CPU and GPU may be packaged in multi-layered manner. The integrated CPU and GPU may be referred to as Application Processor (AP).

The control operations of the controller 170 are described later in detail with reference to the accompanying drawings.

The power supply 180 supplies power of the internal or external power source to the components under the control of the controller 170.

The various embodiments of the present disclosure may be implemented in hardware, firmware, software, or any combination thereof so as to be stored in a computer or similar device-readable storage medium. In the case of implementing the present disclosure by hardware, the present disclosure can be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, and/or the like. In any case, the disclosed various embodiments of the present disclosure can be implemented on the control unit 180. In the case of implementing various embodiments of the present disclosure by software, the procedures functions disclosed in the specification can be implemented with separate software modules. The software modules are capable of performing at least one function and operation described in the specification.

The storage medium may be a non-transitory computer-readable storage medium recording the program capable of executing a desktop mode for the external display device 200 connected to the mobile terminal 100, displaying default desktop window screen on the external display device 200 in the desktop mode, and executing the desktop virtualization function based on the desktop window environment through the external display device 200.

The storage medium may be a non-transitory computer-readable medium recording the program capable of detecting a window creation event in accordance with the execution of an application, determining the display device for displaying the window in response to the window creation event, acquiring the resource for the display device, determining the window layout policy of the display device, generating the window on the display device in the layout according to the determined window layout policy, and displaying the execution screen of the application through the window.

According to various embodiments of the present disclosure, the mobile terminal 100 may be any of cellular communication terminal operating with various communication protocols corresponding to the communication systems, a tablet Personal Computer (PC), a smartphone, a digital camera, a Portable Multimedia Player (PMP), a Media Player (e.g., MP3 player), a handheld e-book, a portable game console, a Personal Digital Assistant (PDA), and the like. In addition, the gesture-based control method according to one of various embodiments of the present disclosure may be applied to various display devices such as a digital television (TV), Digital Signage (DS), and a Large Format Display (LFD).

Although it is difficult to enumerate all of the functional components that can be converged in various manners according to the trend of digital convergence, the mobile terminal 100 may further include an acceleration sensor, a gyro sensor, a GPS module, a Near Field Communication (NFC) module, a vibration module, a camera, an accessory, and/or the like. The accessory may be a detachable part of the mobile terminal such as a pen to make a touch gesture on the display unit 130. A certain component of the mobile terminal 100 may be omitted or replaced by another component according to its implementation.

A description is made of the desktop virtualization according to various embodiments of the present disclosure with reference to FIGS. 2 to 15.

Figure 2:
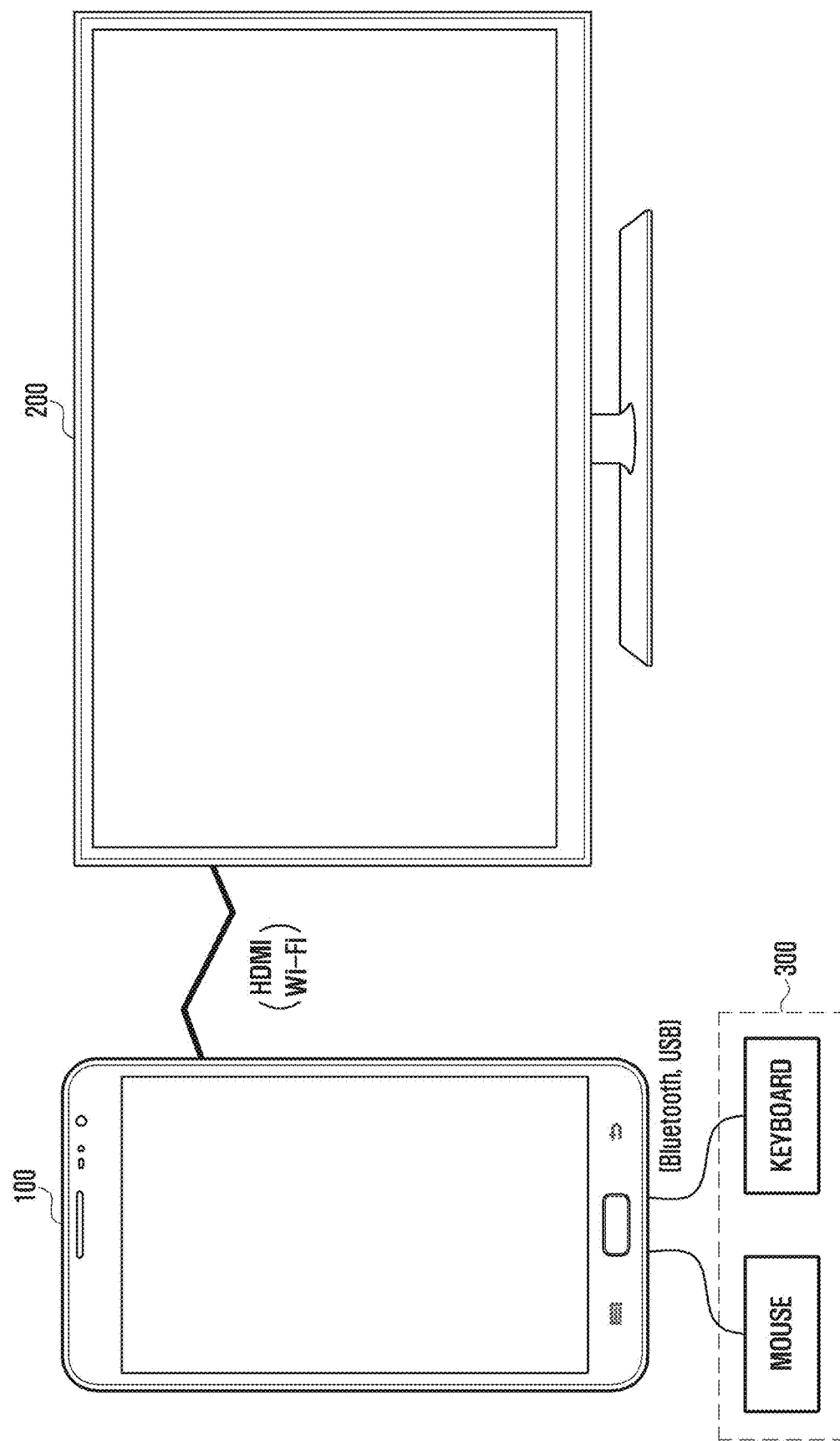
FIG. 2 is a schematic diagram illustrating connections of external devices to a mobile terminal according to an embodiment of the present disclosure.

FIG. 2 is a schematic diagram illustrating connections of external devices to a mobile terminal according to an embodiment of the present disclosure.

Referring to FIG. 2, the system of the present disclosure includes a mobile terminal 100 supporting multi-screen function in connection with an external display device and the external device 200 for displaying the screen of the mobile terminal 100 in a desktop window environment. According to various embodiments of the present disclosure, the system may include external input devices 300 connected to the mobile terminal 100 and capable of manipulating the windows displayed on the mobile terminal 100 and/or the external display device 200. In FIG. 2, the external display device 200 may include a monitor, and the external input devices 300 may include the keyboard and mouse.

As shown in FIG. 2, the mobile terminal 100 and the external display device 200 may connect through a wired interface or a wireless interface. For example, the mobile terminal 100 and the external display device 200 may connect to each other through HDMI or Wi-Fi. The mobile terminal 100 may output various screen data to the external display device 200 through the wired interface (e.g., HDMI) or the wireless interface (e.g., Wi-Fi)

The mobile terminal 100 and the external input devices 300 may connect through a wired interface or a wireless interface. For example, the mobile terminal 100 and the external input devices 300 may connect through the wired interface such as USB or the wireless interface such as Bluetooth. The mobile terminal 100 may receive the control signal input by means of the external input devices 300 through the wired interface (e.g., USB) or the wireless interface (e.g., Bluetooth). The control signal may be the signal for controlling the window screen displayed on the mobile terminal or the signal for controlling the window screen displayed on the external display device 200. According to various embodiments of the present disclosure, the mobile terminal 100 is connected to the external display device 200 and the external input devices 300 as shown in FIG. 2 so as to control the window screen displayed on the external display device 200 by means of the external input device 300 in the state that the desktop virtualization function is activated in association with the external display device 200.

If a control signal is received from the external input devices 300, the mobile terminal 100 controls the window screen displayed on the external display device 200 and processes operations for displaying the result on the external display device 200 in the state of maintaining the window screen of the mobile terminal 100.

Figure 3:
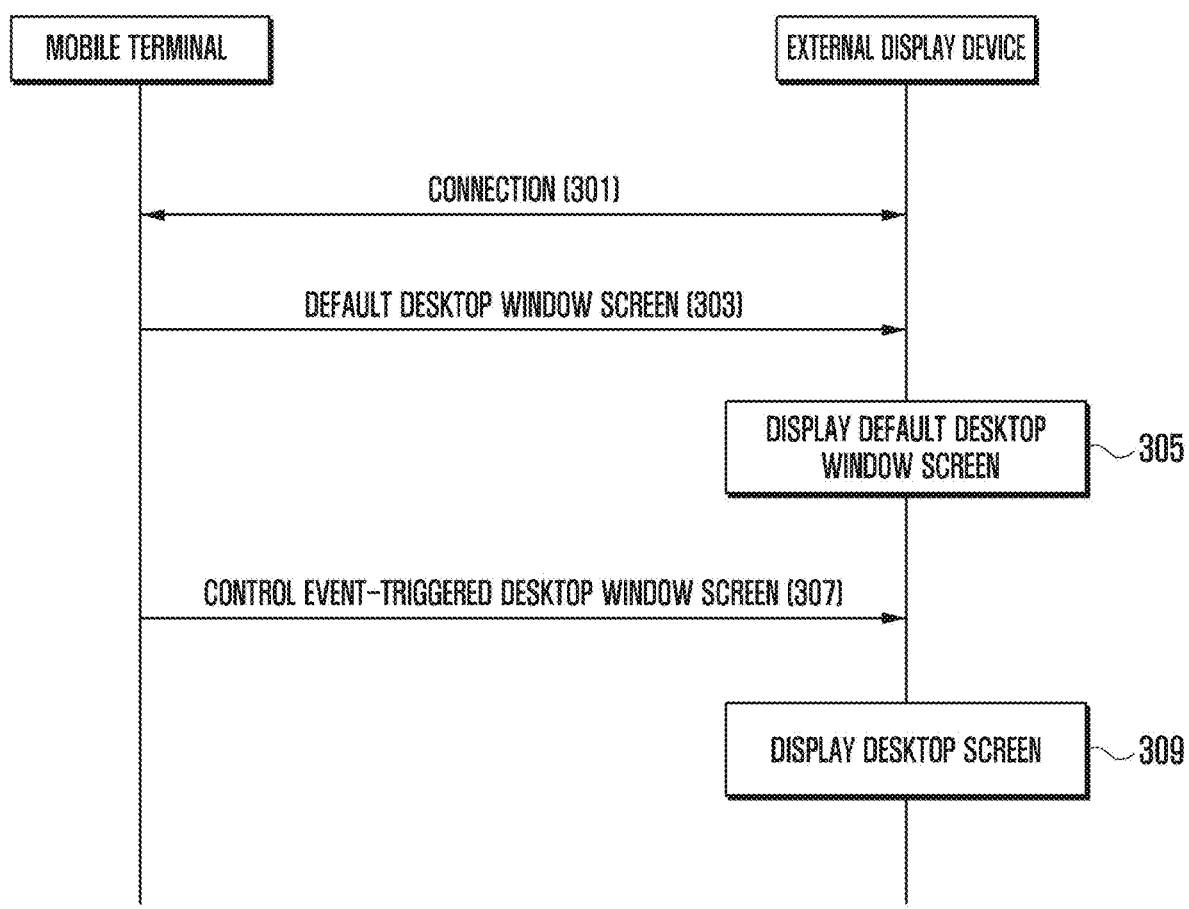
FIG. 3 is a signal flow diagram illustrating interoperation between a mobile terminal and an external display device in a display system according to an embodiment of the present disclosure.
Figure 4:
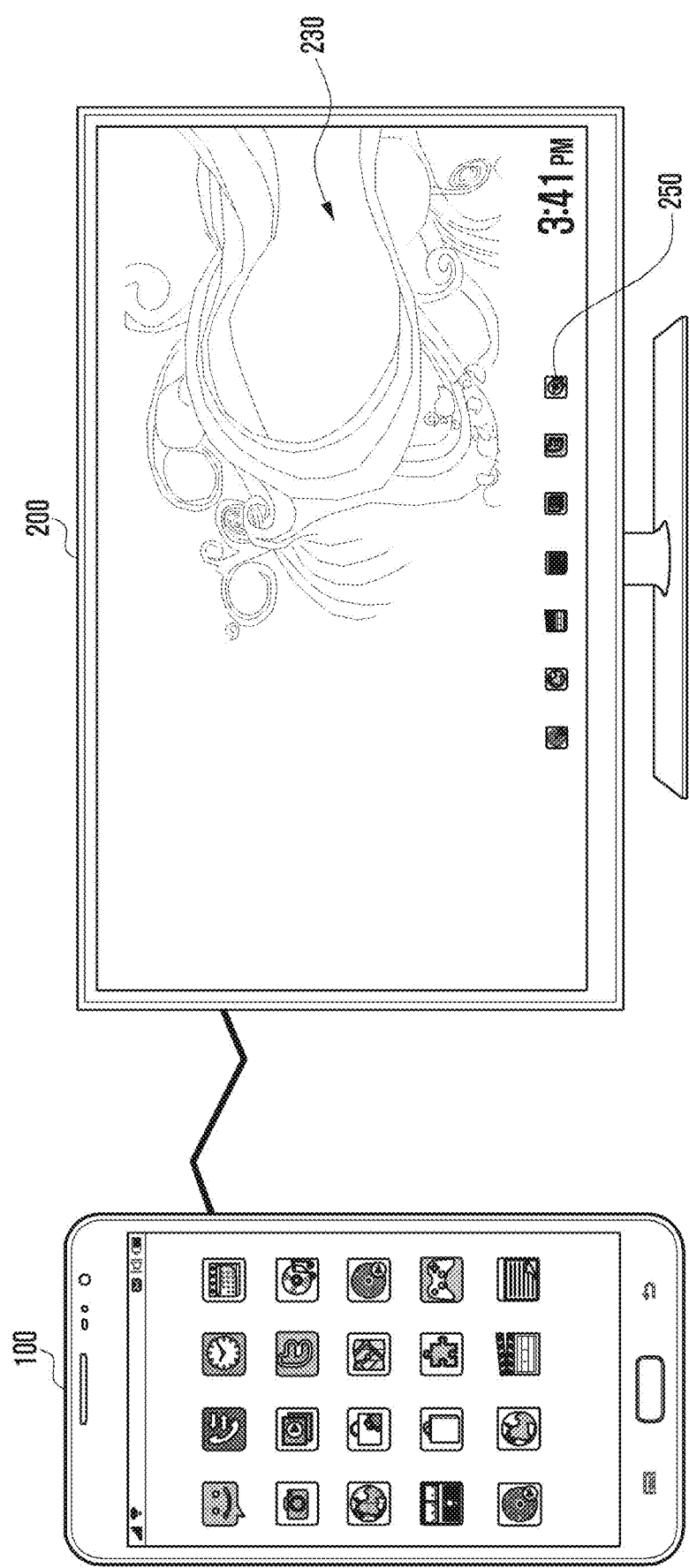
FIGS. 4 and 5 are diagrams illustrating displays of a mobile terminal and an external display device according to an embodiment of the present disclosure.
Figure 5:
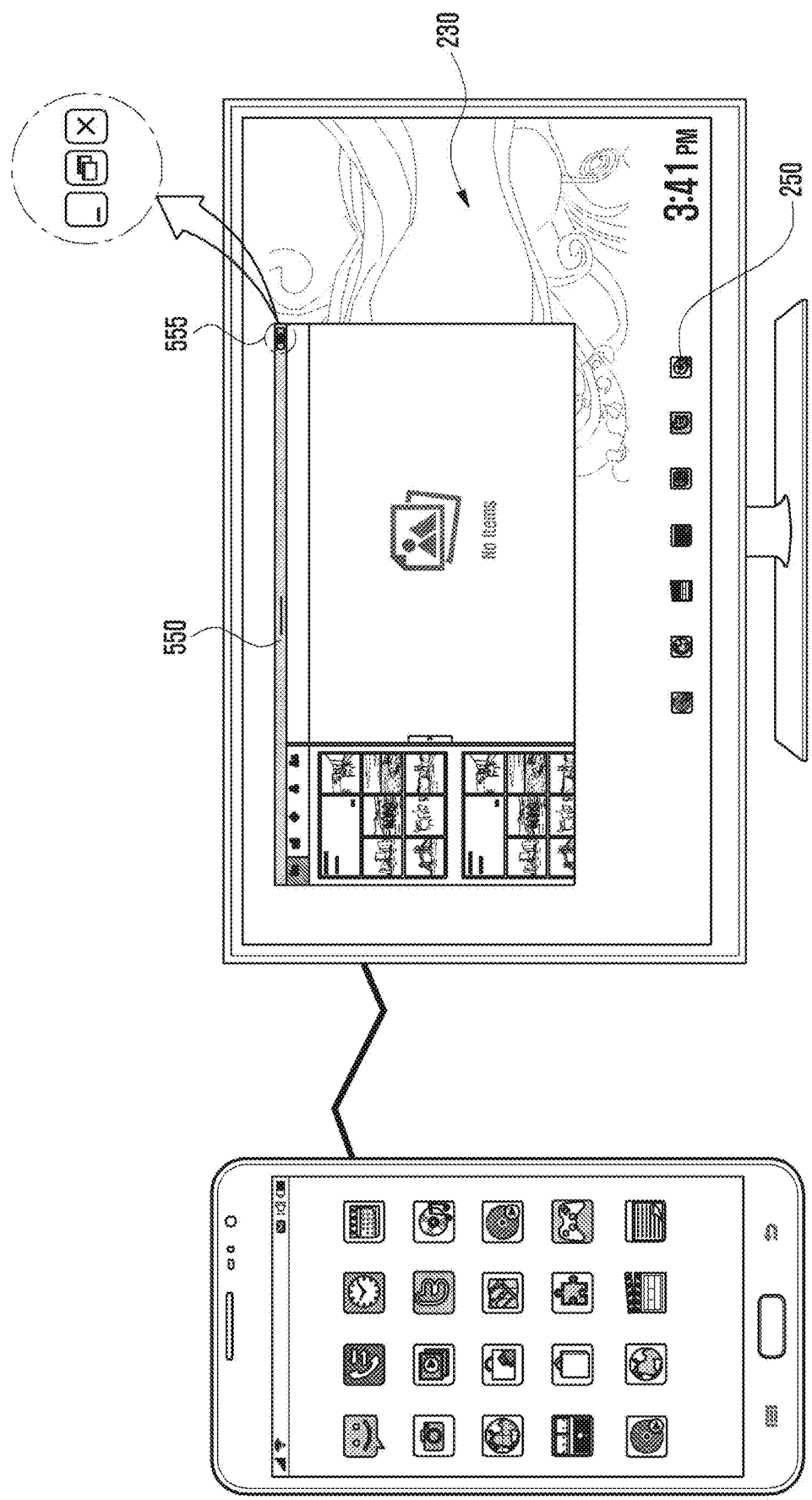

FIG. 3 is a signal flow diagram illustrating interoperation between a mobile terminal and an external display device in a display system according to an embodiment of the present disclosure, and FIGS. 4 and 5 are diagrams illustrating displays of a mobile terminal and an external display device according to an embodiment of the present disclosure.

Referring to FIGS. 3, 4, and 5, at operation 301 the mobile terminal 100 is connected to the display device 200.

If a connection is established between the mobile terminal 100 and the display device 200 at operation 301, then at operation 303, the desktop mode is executed automatically such that the mobile terminal sends the external display device 200 a default desktop window screen. If the desktop mode is executed, the mobile terminal 100 executes the desktop mode internally and transmits the default desktop window screen to the external display device 200 in the state of maintaining the current display of the mobile terminal 100 as shown in FIG. 4. When the external display device 200 is connected, the mobile terminal 100 acquires the information on the screen size of the external display device 200 and determines the size of the default desktop window screen corresponding to the screen size. The information on the screen size of the external display device 200 may be acquired in the form of polling or push at the time when the external device 200 is connected.

If external display device 200 connects to the mobile terminal 100 at operation 301 and, if the default desktop window screen is received from the mobile terminal 100 at operation 303, then at operation 305, the external display device 200 displays the default desktop window screen. The default desktop window screen may include desktop shortcut icons 250 (or icon list) of certain applications capable of executing operations corresponding to the desktop window environment through a predetermined background screen 230 and the external display device 200.

If a control event for a desktop window environment task occurs, then at operation 307, the mobile terminal 100 sends the screen corresponding to the control event to the external display device 200. For example, if the user makes an input for selecting one of the desktop shortcut icons 250 displayed on the external display device 200 by means of the mobile terminal 100 or the external input device 300, the mobile terminal 100 determines the application represented by the selected icon 250. The mobile terminal 100 executes the determined application in the desktop mode and sends the screen created for the desktop window environment (application desktop window screen) to the external display device 200. For example, when the execution of an application represented by the icon selected on the desktop area is detected, the mobile terminal 100 executes the application having the layout appropriate for the desktop environment.

If the external display receives the application desktop window screen transmitted by the mobile terminal 100 at operation 307, then at operation 309, the external display device 200 displays the application desktop window screen. The application desktop window screen is provided in the form of the application execution screen having the layout for the desktop window environment different from the window screen of the mobile terminal 100 as shown in FIG. 5. At this time, the screen of the mobile terminal 100 may be maintained in a current state. The application execution screen includes a status bar at the top of the window frame corresponding to the desktop window environment unlike the mobile application execution screen displayed on the mobile terminal 100. The status bar 550 may display the status information (application name, and/or the like) on the execution screen (or corresponding window). Particularly, the status bar 550 may include window size adjustment buttons 555 such as minimization, maximization, and close buttons.

Figure 6:
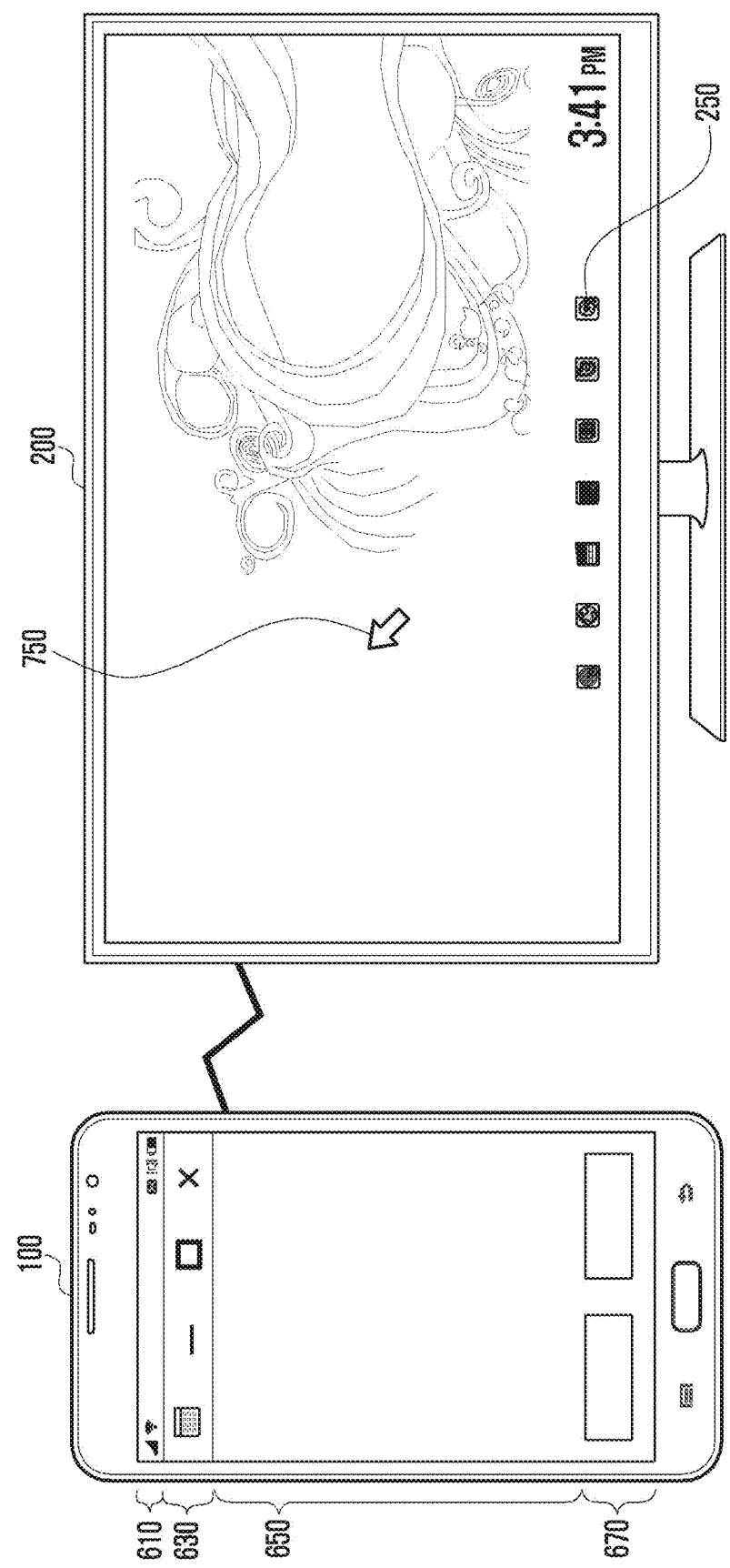
FIGS. 6 and 7 are diagrams illustrating displays of a mobile terminal and an external display device for explaining an input operation according to an embodiment of the present disclosure.
Figure 7:
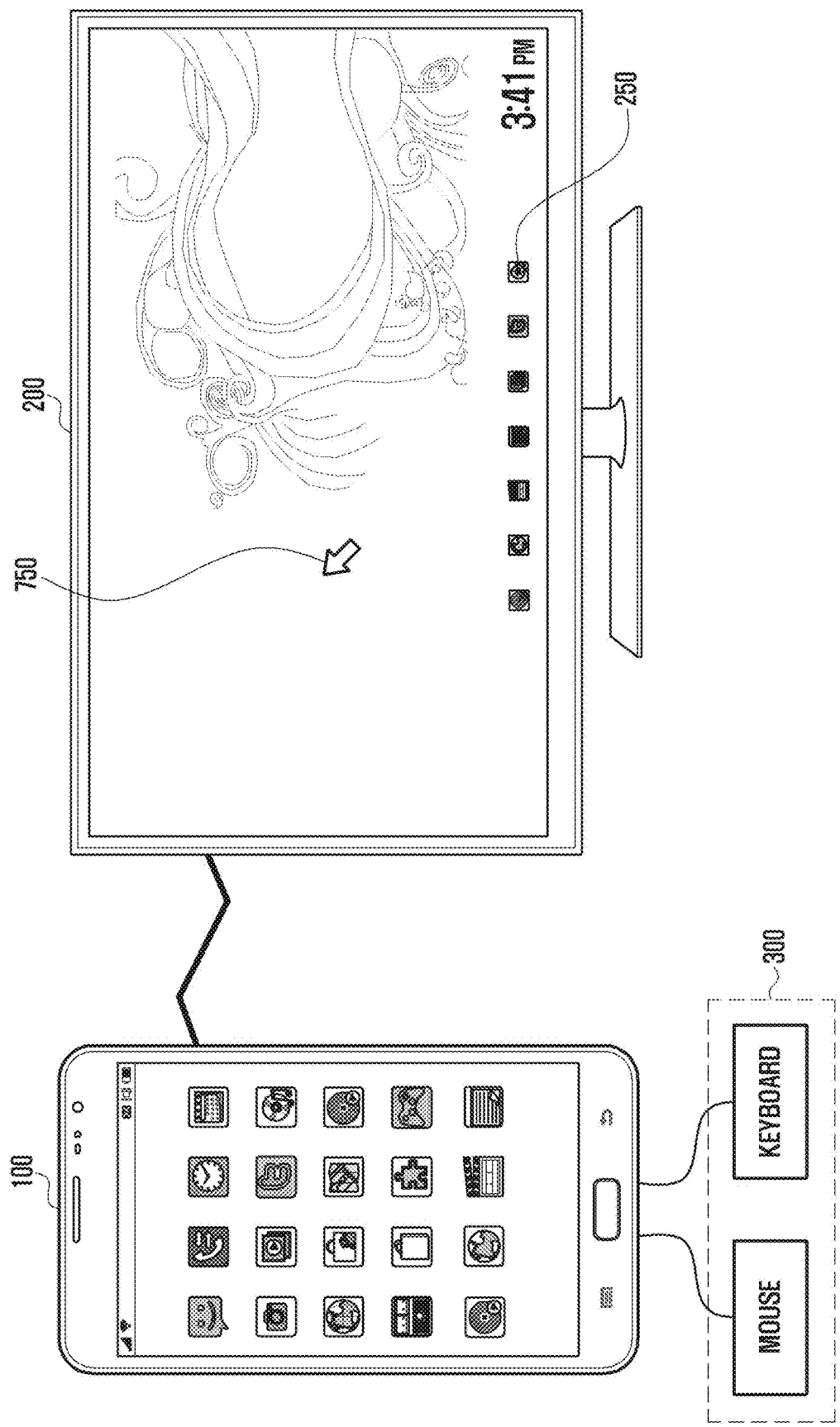

FIGS. 6 and 7 are diagrams illustrating displays of a mobile terminal and an external display device for explaining an input operation according to an embodiment of the present disclosure.

FIG. 6 shows screen displays in the case of using the mobile terminal 100 as the input means of the external display device 200 according to an embodiment of the present disclosure, and FIG. 7 shows screen displays in the case of using the external input device 300 connected to the mobile terminal 100 as the input means of the external display device 200 according to an embodiment of the present disclosure.

Referring to FIG. 6, the mobile terminal 100 may display a virtual input device (e.g., virtual touchpad) according to the user's selection. The user may input a control signal using the virtual input device displayed on the mobile terminal 100 to make a manipulation such as moving the pointer 650 displayed on the external display device 200, executing application, moving execution window screen, enlarging/shrinking window size, minimizing size, maximizing size, closing window, executing a desktop shortcut icon 250, or the like.

According to various embodiments the present disclosure, the virtual input device may provide a window size adjustment region 630 capable of executing the functions of the buttons corresponding to the minimization button, maximization button, and close button of the status bar 550 at the top frame of the window displayed on the external display device 200; a touchpad region 650 for detecting a gesture for moving the pointer 750 on the external display device 200, icon selection gesture, single touch gesture, and multi-touch gesture; and an indicator region 610 for providing various operation status information of the mobile terminal 100 in real time. The virtual input device may also provide a keypad execution button 670 for executing the virtual touch keypad.

Referring to FIG. 7, the mobile terminal 100 may be connected with the external input devices 300 (e.g., keyboard and mouse) through wireless links such as Bluetooth links or wired links such as USB cables. The user may input a control signal using the external input device 300 connected to the mobile terminal 100 to perform the manipulation of such as movement of the pointer 750 in the desktop region displayed on the external display device 200, application execution, executed window movement, window size enlargement/shrink, size minimization, size maximization, window close, executing a desktop shortcut icon 250, or the like.

FIGS. 8, 9, 10, 11, and 12 are diagrams illustrating screen displays of a mobile terminal and an external device for explaining a desktop virtualization operation according to an embodiment of the present disclosure.

Figure 8:
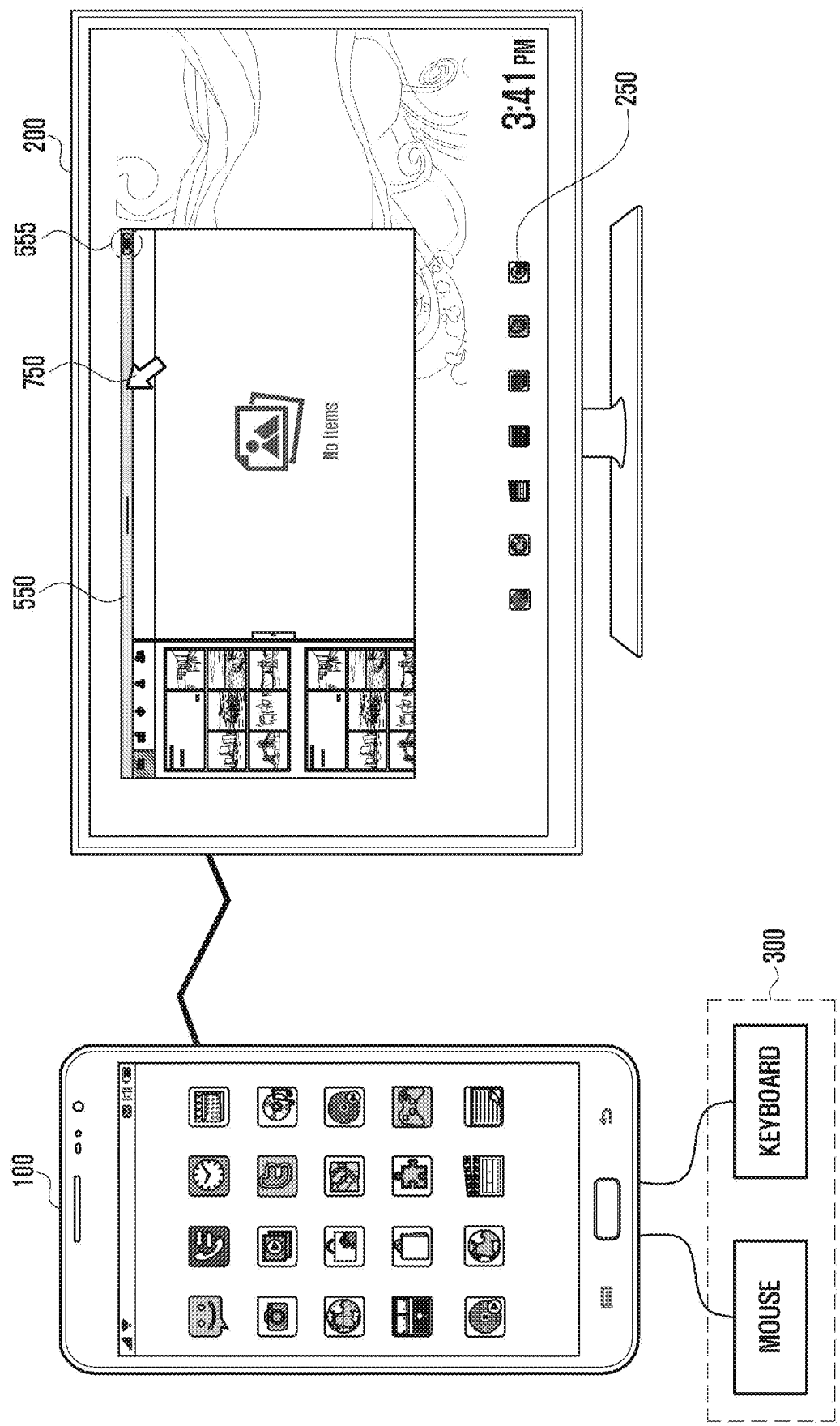
FIGS. 8, 9, 10, 11, and 12 are diagrams illustrating screen displays of a mobile terminal and an external device for explaining a desktop virtualization operation according to an embodiment of the present disclosure.

Referring to FIG. 8, a screen display in the state that an application is running in the desktop window environment of the external display device 200 under the control of the mobile terminal 100 is illustrated. As shown in FIG. 8, the application execution window provides a status bar 550 having a window size adjustment button 555 at the tope side of the window frame. FIG. 8 is directed to the case in which the external input device 300 is connected to the mobile terminal 100 for manipulating the window displayed on the external display device 200 such that the pointer 750 moves on the desktop region according to the input mode of the external input device 300.

When an application execution command is input by selecting an icon in the desktop region of the external display device 200, the mobile terminal 100 executes the application having the layout for the desktop environment and processes the corresponding screen output. If the application desktop window screen is received from the mobile terminal 100, the external display device 200 displays the application desktop window screen. The application desktop window screen is the application execution screen formed in the layout fit for the desktop environment unlike the window screen of the mobile terminal 100 as shown in FIG. 8. At this time, the screen of the mobile terminal 100 may be maintained in a current state.

Figure 9:
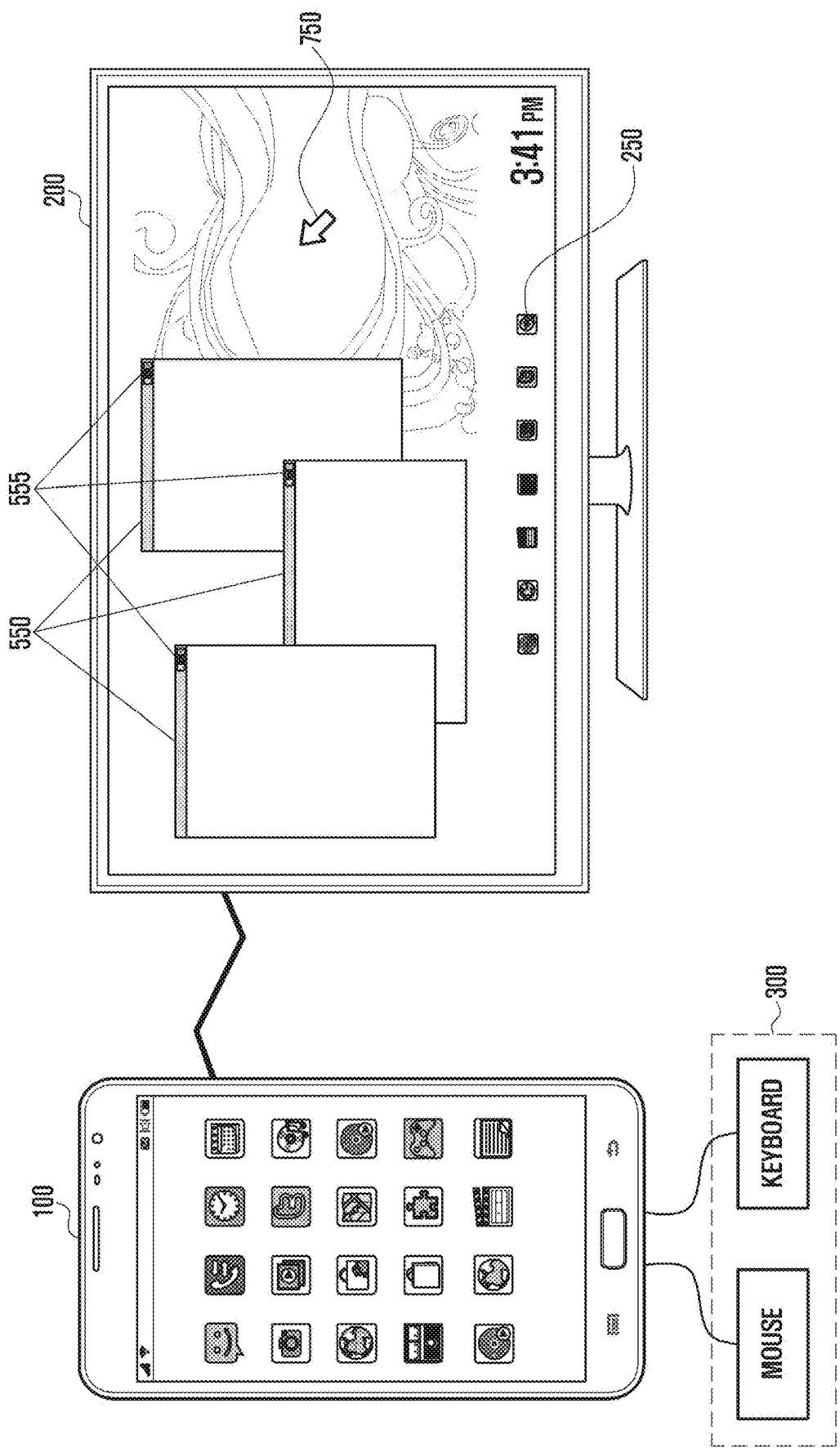

Referring to FIG. 9, a screen display in the state that plural applications are executed in the desktop window environment of the external display device 200 is illustrated. Particularly, when the plural application execution windows may be provided with a status bar 550 having the window size adjustment buttons 555 at the top sides of their frames respectively. The status bar 550 of each window may provide the status information of the corresponding application. FIG. 9 is directed to the case in which the window displayed on the external display device 200 is adjusted by means of the external input device 300 connected to the mobile terminal 100 and the pointer 750 is provided on in the desktop region according to the input mode of the external input device 300.

Figure 10:
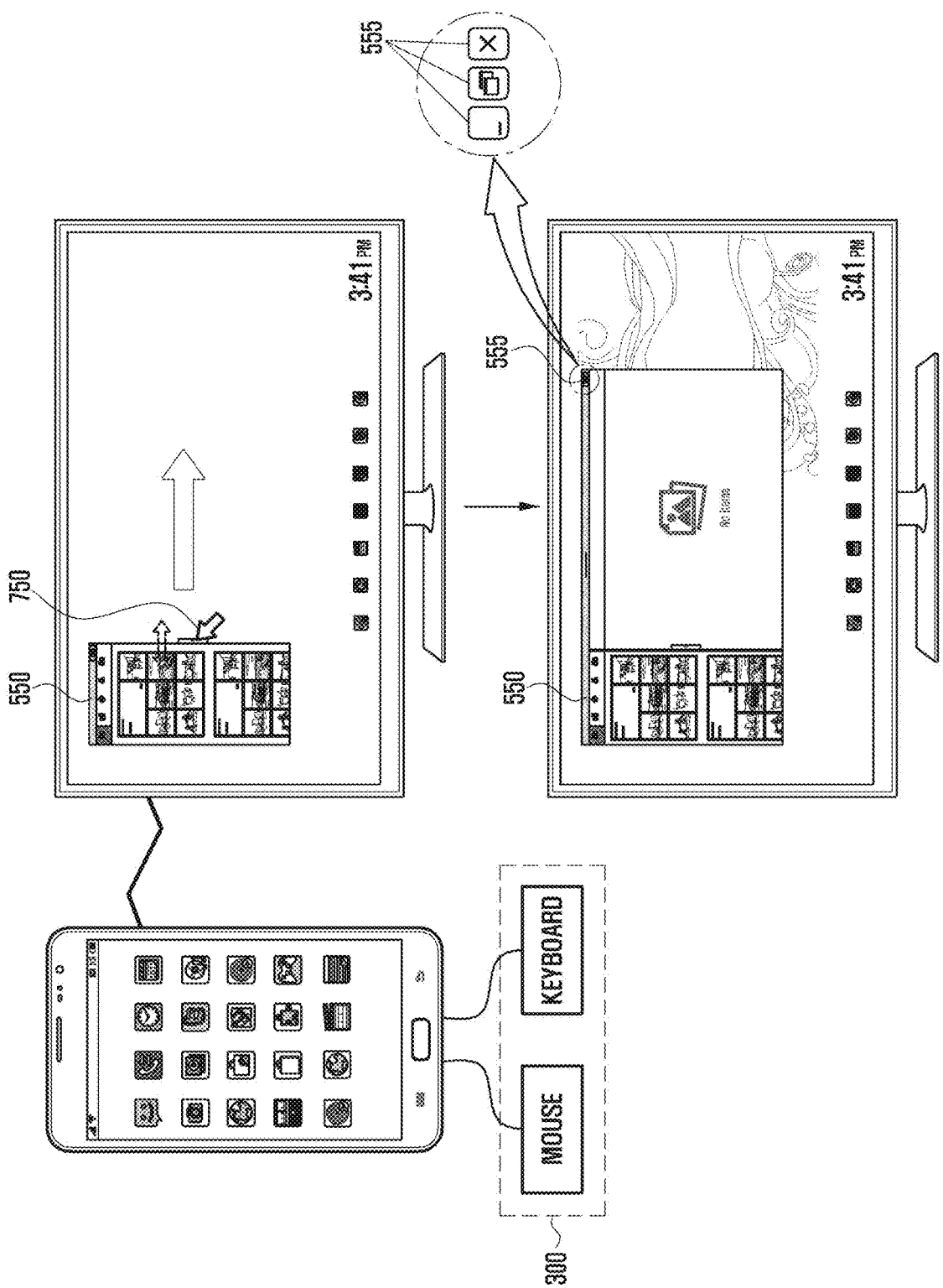

Referring to FIG. 10, a screen display in the case of extending the execution window of the application according to the user's manipulation in the state that the application is executed in the desktop window environment through the external display device 200 is illustrated. The application execution window may be provided with a status bar 550. The status bar 550 may further include window size adjustment buttons 555. As shown in FIG. 10, the user may move the pointer 750 to the right most position of the window frame by means of the external input device 300. When the pointer 750 is placed at the edge, the pointer 750 is changed in shape as an indicator to indicate that the window size can be extended or shrunk. The user may make a control signal for right direction movement by manipulating the external input device 300. Then the window is extended as shown in FIG. 10. For example, if the window is extended in the state that a gallery list is displayed in the window according to the execution of the gallery application, the window screen is provided in such a way of including the region presenting detailed information (enlarged photo) on the photos of the gallery list.

Figure 11:
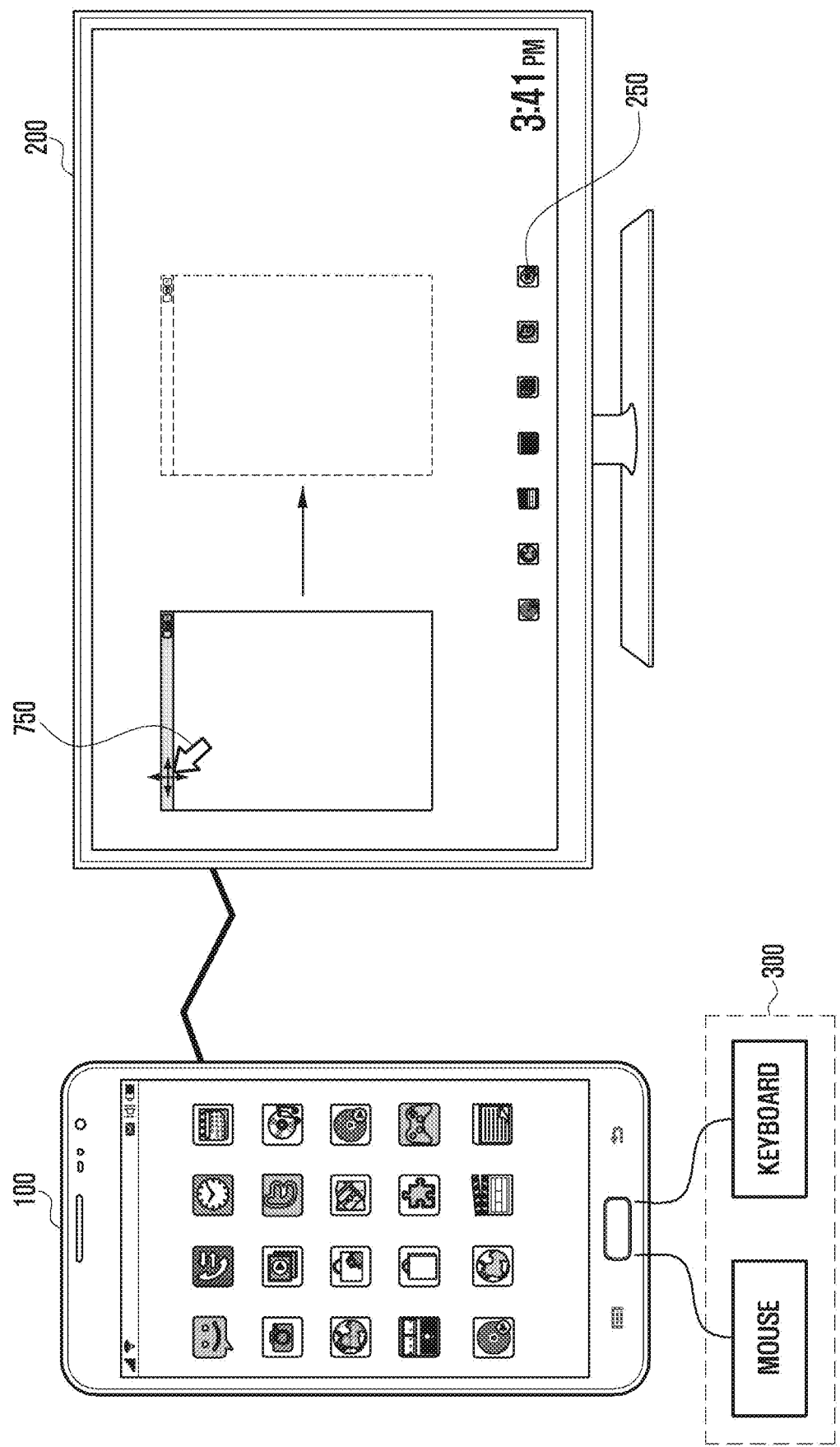

Referring to FIG. 11, screen displays in the case of moving an application execution screen according to the user's manipulation in the state that the application is executed in the desktop window through the external display device 200 under the control of the mobile terminal 100 are illustrated. As shown in FIG. 11, the user may move the pointer 750 at the top side of the window frame (e.g., the status bar 550) using the external input device 300. When the pointer 750 is placed at a position on the status bar 550, the pointer 750 may be changed in shape to indicate that the window may be moved. In this state, the user may make a control input for movement in a direction (e.g., rightward) in the display region of the external display apparatus 200 by manipulating the external input device 300. Then the window moves in response to the user input as shown in FIG. 11.

Figure 12:
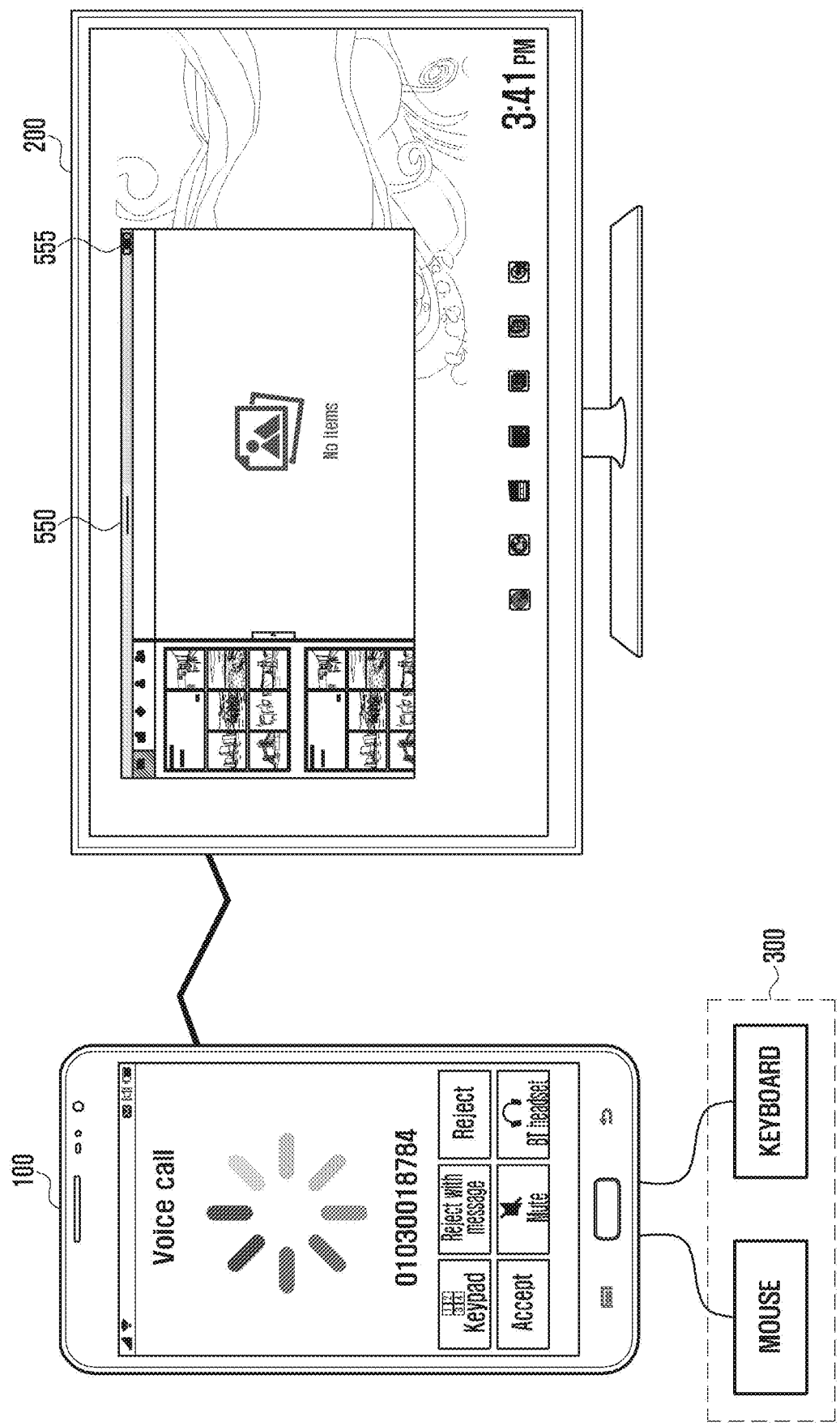

Referring to FIG. 12, screen displays in the state that a specific application is executed in the desktop window environment through the external display device 200 under the control of the mobile terminal 100 are illustrated. As shown in FIG. 12, the application execution window may be provided with the status bar 550 having the window size adjustment button 555. Particularly, FIG. 12 shows the case in which the application executed in the region of the mobile terminal 100 in the state of FIG. 8. As shown in FIG. 12, if an application execution event such as incoming call reception in the state that the mobile terminal 100 is connected to the external display device 200, the screen of the external display device 200 displays the window screen (e.g., incoming call reception status screen) on the mobile terminal 100 according to the execution event at the mobile terminal in the state of maintain the current state. As shown in FIG. 12, as the application is executed in the mobile terminal 100, the pointer 750 may disappear on the current screen of the external display device 200. This is to indicate intuitively that the current manipulation is performed on the mobile terminals.

If an application execution command input by the selection of the icon on the desktop region of the external display device 200 is detected, the mobile terminal 100 executes an application having the desktop environment-friendly layout and processes the screen display. If the application desktop window screen is received from the mobile terminal 100, the external device 200 displays the application desktop window screen having the desktop environment-friendly layout. If the application is executed in the region of the mobile terminal, the mobile environment-friendly application screen is displayed as shown in FIG. 12.

Although FIGS. 8 to 12 are directed to the case in which the external input device 300 is connected to the mobile terminal 100, the desktop window environment of the external display device 200 may be manipulated through the virtual input device provided on the mobile terminal 100 as described above with the omission of the external input device 300.

Figure 13:
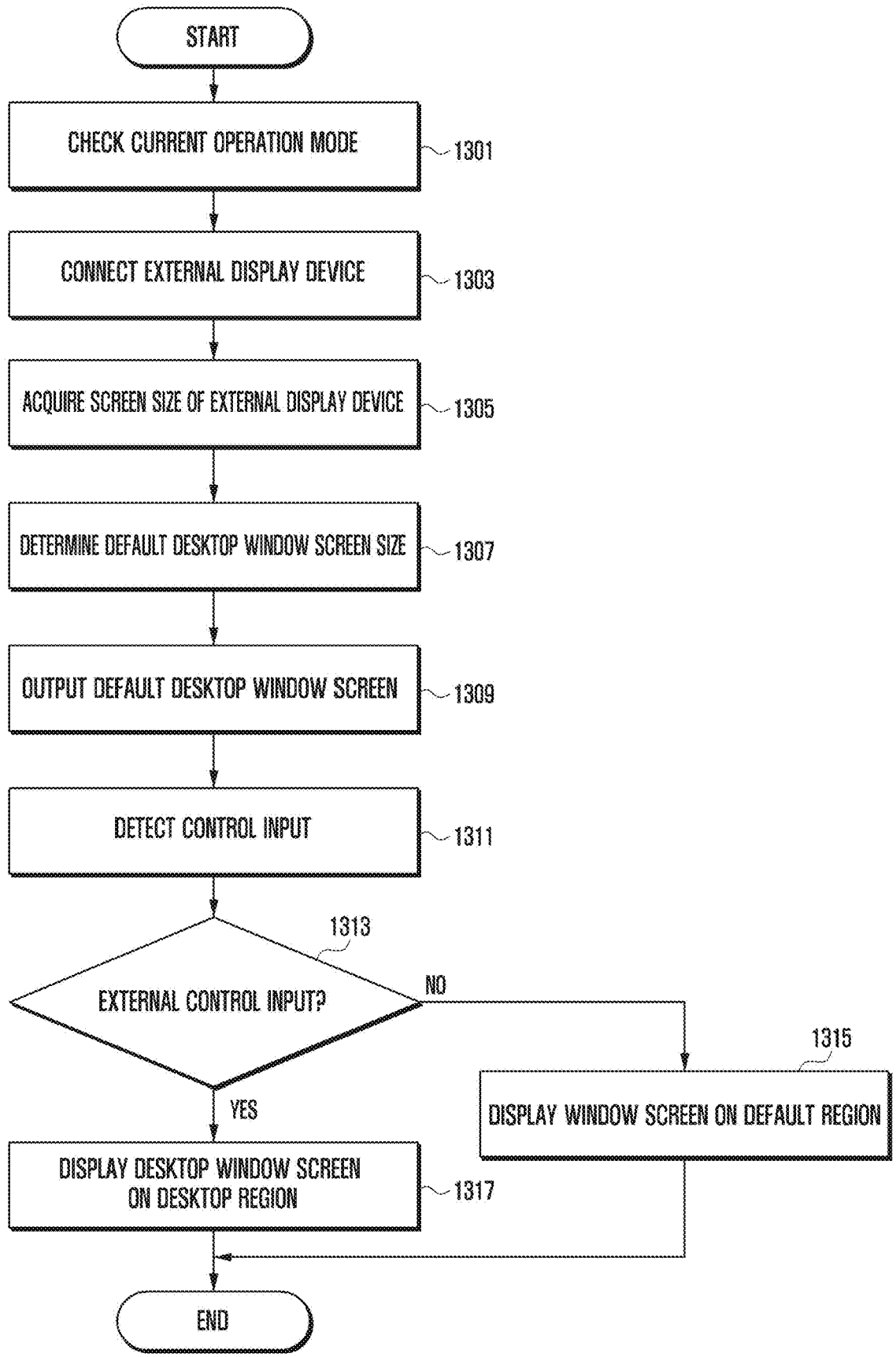
FIG. 13 is a flowchart illustrating a desktop virtualization method of a mobile terminal according to an embodiment of the present disclosure.

FIG. 13 is a flowchart illustrating a desktop virtualization method of a mobile terminal according to an embodiment of the present disclosure.

Referring to FIG. 13, at operation 1301, the controller 170 determines a current operation mode (e.g., standby mode and application execution mode).

At operation 1303, the controller 170 detects a connection of the external device 200. For example, the controller 170 may detect the connection of the external display device 200 through a wired (HDMI) link or a wireless (Wi-Fi) link. If the external display device 200 is connected, the controller 170 executes the desktop mode for desktop virtualization and transmits a default desktop window screen to the external display device 200. If the external display device 200 is connected, the controller 170 may determine the type of the connection between the mobile terminal 100 and the external display device 200.

When the external display device 200 is connected to the mobile terminal 100 at operation 1303, the controller 170 proceeds to operation 1305 at which the controller 170 acquires the information on the screen size of the external display device 200. The information on the screen size of the external display device 200 is acquired in the way of polling or push at the time when the mobile terminal and the external display device 200 connect to each other.

At operation 1307, the controller 170 determines the size of the default desktop window screen based on the information on the screen size of the external display device 200.

At operation 1309, the controller 170 outputs the default desktop window screen corresponding to the determined screen size to the external display device 200. The controller 170 may process the output of the default desktop window screen through wired (HDMI) or wireless (Wi-Fi) link depending on the connection type of the external display device 200.

At operation 1311, the controller 170 detects a control input.

If a control input is detected in the state that the default desktop window screen for desktop mode operation is displayed on the external display device 200 at operation 1311, then the controller 170 proceeds to operation 1313 at which the controller 170 determines whether the control input is an internal control input for controlling the default region of the mobile terminal 100 or an external control input for controlling the desktop region of the external display device 200.

If the controller 170 determines that the control input is not the external control input (e.g., if the control input is the internal control input), at operation 1313, then the controller 170 proceeds to operation 1315 at which the controller 170 controls such that the execution screen is displayed in the mobile terminal-friendly layout in the default region of the mobile terminal while the current screen of the external display device 200 is maintained. For example, the controller 170 controls displaying the window screen of the default region of the mobile terminal 100.

Conversely, if the controller 170 determines that the control input is the external control input at operation 1313, then the controller 170 proceeds to operation 1317 at which the controller 170 controls such that the desktop window screen is displayed on the desktop region of the external display device 200 in the desktop environment-friendly layout.

Figure 14:
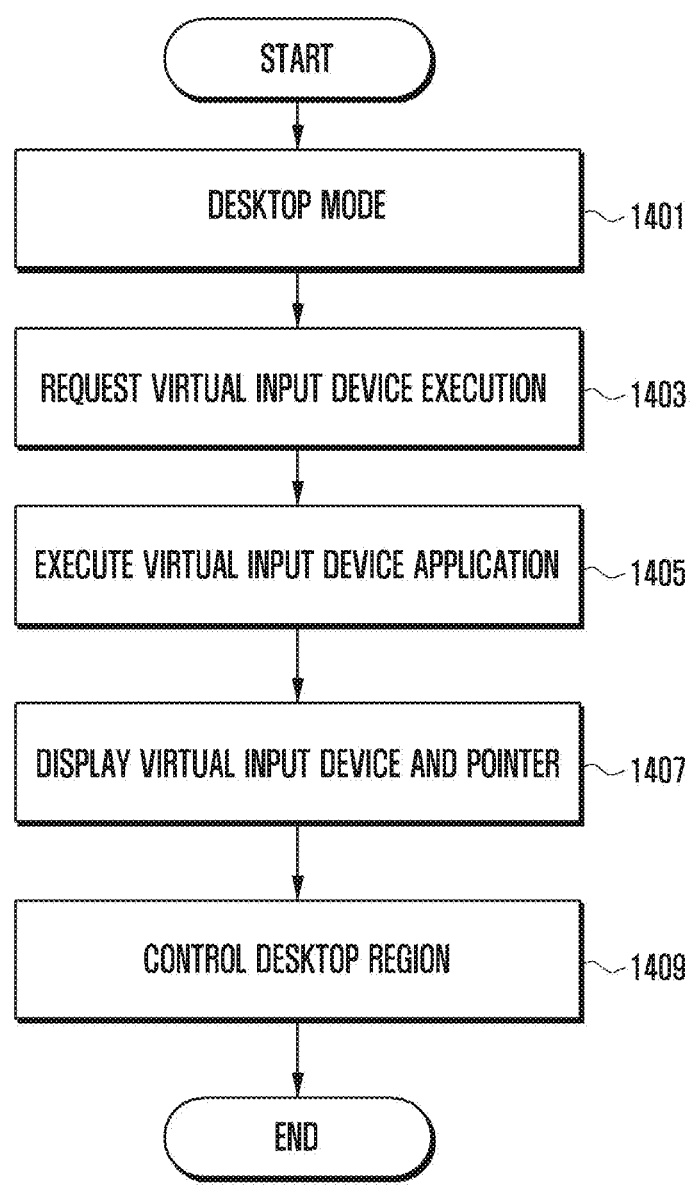
FIG. 14 is a flowchart illustrating a desktop virtualization method of a mobile terminal according to an embodiment of the present disclosure.

FIG. 14 is a flowchart illustrating a desktop virtualization method of a mobile terminal according to an embodiment of the present disclosure.

Referring to FIG. 14, a flowchart is illustrated in a case in which no external input device is connected to the mobile terminal 100. However, the mobile terminal 100 provides a virtual input device for manipulating the data region of the external display device.

Referring to FIG. 14, at operation 1401, the controller 170 determines the execution of the desktop mode at operation 1401. For example, the controller 170 determines whether the mobile terminal 100 is operating in the desktop mode.

At operation 1403, the controller 170 determines whether a request for virtual input device execution is detected.

If a virtual input device execution request is detected in the desktop mode at operation 1403, the controller 170 proceeds to operation 1405 at which the controller 170 executes the virtual input device application. For example, the controller 170 may receive the input requesting for the execution of the virtual input device through manipulation of the mobile terminal (e.g., menu manipulation and shortcut key input) in the state in which the default desktop window screen is displayed on the external display device 200. Then the controller 170 controls the mobile terminal 100 such that the virtual input device application is executed in the default region of the mobile terminal 100 in the state of maintain the default desktop window screen of the external display device 200.

At operation 1407, the controller 170 displays the virtual input device on the mobile terminal 100 and the pointer on the external display device 200. For example, the controller 170 outputs the virtual input device in match with the layout of the default region of the mobile terminal 100 with the execution of the virtual input device application and controls to present the pointer 750 in the desktop region of the external display device 200.

At operation 1409, the controller 170 controls the desktop region according to the user input made through the virtual input device in the state in which the virtual input device is displayed. For example, the controller 170 may controls the operations as described with reference to FIGS. 8, 9, 10, 11, and 12. For example, the controller 170 may control the tasks of the desktop environment such as pointer movement in the desktop region, application execution, executed window screen movement, window size extension/shrink, size minimization, size maximization, window close, and/or the like.

Figure 15:
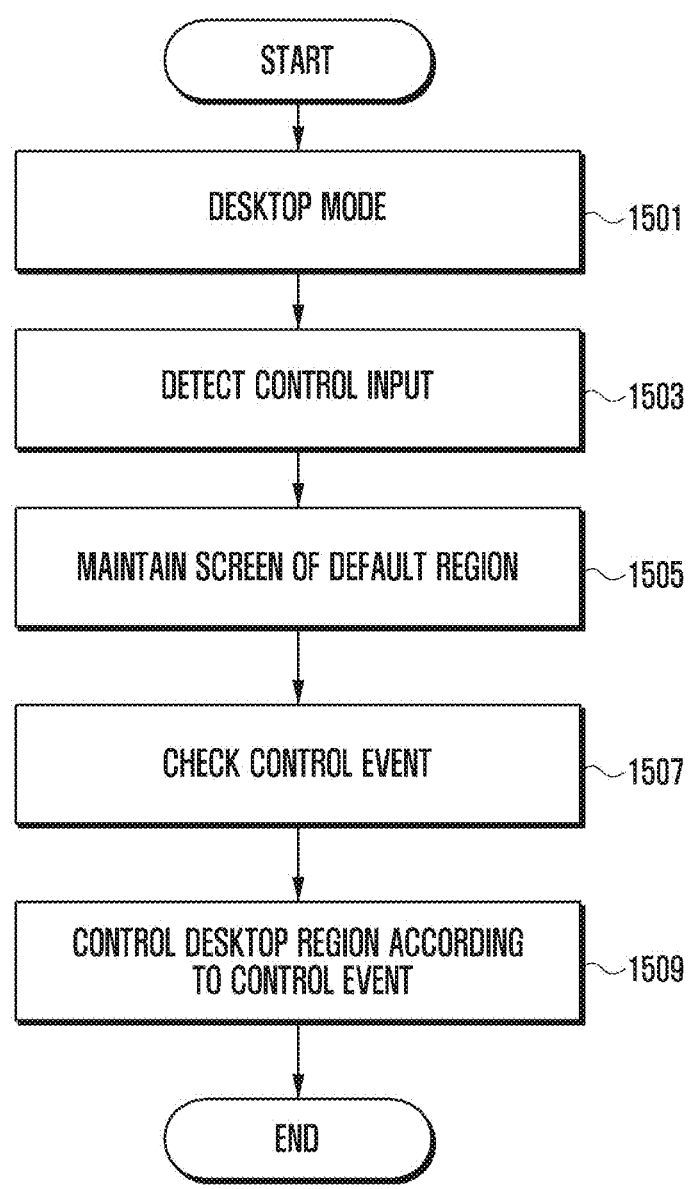
FIG. 15 is a flowchart illustrating a desktop virtualization method of a mobile terminal according to an embodiment of the present disclosure.

FIG. 15 is a flowchart illustrating a desktop virtualization method of a mobile terminal according to an embodiment of the present disclosure.

Referring to FIG. 15, the operations of processing the input from the external input device 300 in the state in which the external device 300 is connected to the mobile terminal 100 is illustrated.

At operation 1501, the controller 170 determines the execution of the desktop mode.

At operation 1503, the controller 170 receives a control input made through the external input device 300.

If a control input is received from the external input device 300 in the desktop mode at operation 1503, then the controller 170 proceeds to operation 1505 at which the controller 170 maintains the current state of the screen of the default region of the mobile terminal 100.

Thereafter, at operation 1507, the controller 170 determines the control event of the external input device 300. For example, the controller 170 is capable of determining whether the control input is made through the keyboard or the mouse and which task is to be executed according to the control input.

At operation 1509, the controller 170 controls output of the desktop region according to the identified control input. For example, the controller 170 may control the movement of the pointer in the desktop region of the external display device 200, application execution, executed window screen movement, window size enlargement/shrink, size minimization, size maximization, window close, or the like while maintaining the current state of the screen of the mobile terminal 100.

Descriptions are made of the various embodiments related to the per-display device window layout provision function hereinafter with reference to FIGS. 16, 17, 18, and 19A, 19B, 19C, and 19D.

Figure 16:
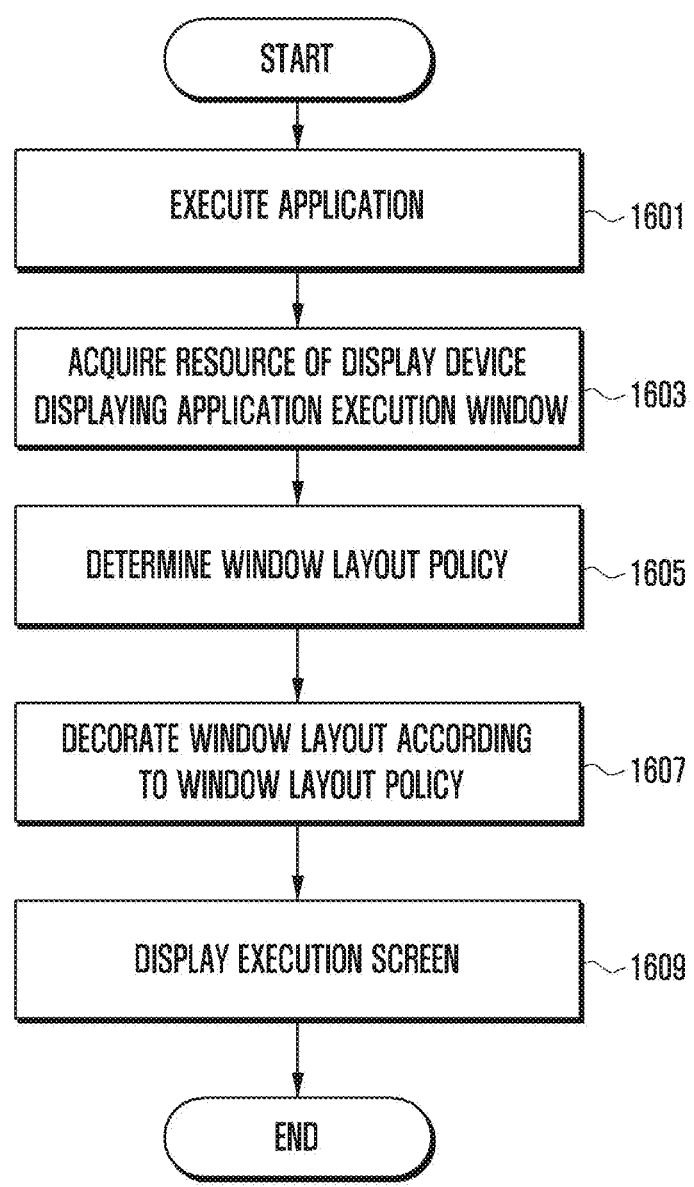
FIG. 16 is a flowchart illustrating a per-display device window layout provision method of a mobile terminal according to an embodiment of the present disclosure.

FIG. 16 is a flowchart illustrating a per-display device window layout provision method of a mobile terminal according to an embodiment of the present disclosure.

Referring to FIG. 16, at operation 1601, the controller 170 detects an input requesting to execute an application.

If the controller 170 detects a request for an application execution input by the user at operation 1601, then the controller 170 proceeds to operation 1603 at which the controller 170 acquires the resource of the display device on which the application is executed. For example, if the application execution request is detected, the controller 170 identifies the display device on which the application execution screen is to be displayed and acquires the resource of the display device. The resource of the display device is the resource of the display devices currently connected to the mobile terminal 100 (e.g., display unit 130 of the mobile terminal 100 and external display device connected to the mobile terminal 100) and acquired from the storage unit 150 or the external display device.

If the controller 170 acquires the resource of the display device on which the application execution screen is displayed at operation 1603, then the controller 170 proceeds to operation 1605 at which the controller 170 determines a window layout policy configured for the acquired resource. For example, the controller 170 may retrieve a predetermined window layout policy corresponding to the resource of the display device from the mapping table of the storage unit 150.

At operation 1607, the controller 170 decorates (e.g., configures) the window layout of the application according to the determined window layout policy. For example, the controller 170 configures the layout of the window presenting the application execution screen according to the window layout policy.

At operation 1609, the controller 170 generates the window decorated (e.g., configured) according to the window layout on the display device and displays the application execution screen.

As described with reference to FIG. 16, when the user executes an application, the controller 170 acquires the resource of at least one display device currently connected to the mobile terminal 100 and selects one of the window layout policies configured based on the resource of the display device. The controller 170 decorates (e.g., configures) the window layout of the executed application according to the determined window layout policy.

Figure 17:
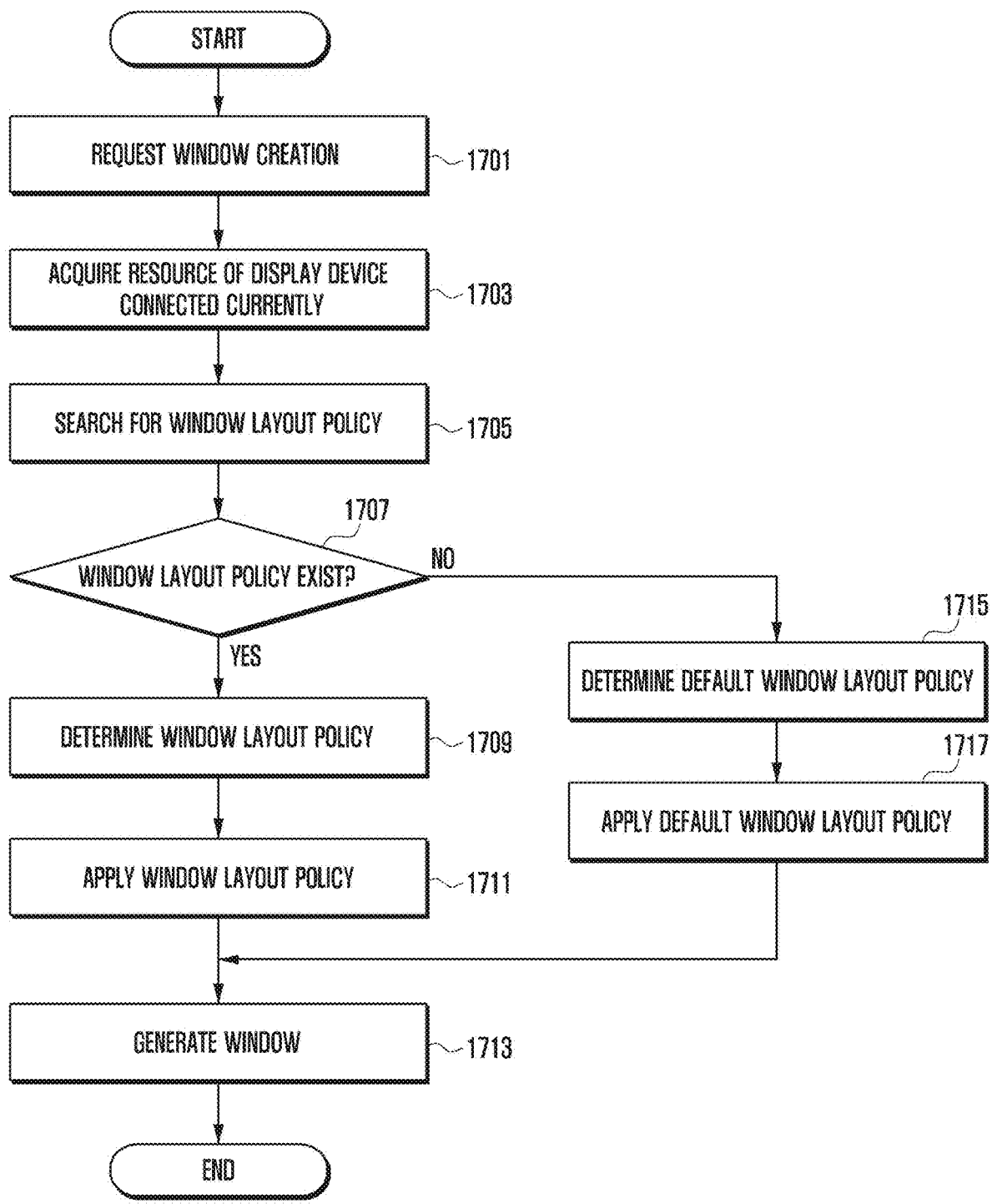
FIG. 17 is a flowchart illustrating a per-display device window layout management method of a mobile terminal according to an embodiment of the present disclosure.

FIG. 17 is a flowchart illustrating a per-display device window layout management method of a mobile terminal according to an embodiment of the present disclosure.

Referring to FIG. 17, at operation 1701, the controller 170 detects the window generation request of the user.

At operation 1703, the controller 170 acquires the resource of the currently connected display device. For example, if the user's application execution request is detected, the controller 170 may determine that the application execution request corresponds to the window generation event for generating a new window. The controller 170 determines the display device for which the window is generated according to the application execution (e.g., display unit 130 of the mobile terminal 100 and external display device connected to the mobile terminal 100) and acquires the resource of the determined display device. The resource of the display device may include the resource of at least one of the display unit 130 of the mobile terminal and the external display device connected to the mobile terminal 100.

At operation 1705, the controller 170 searches for the window layout policy for the resource of the display device.

At operation 1707, the controller 170 determines whether the window layout policy is retrieved. For example, the controller 170 scans the resources of the display devices in correspondence to the resource acquired from the mapping table stored in the storage unit 150 and retrieves the window layout policy mapped to the display device of the acquired resource.

If the controller 170 retrieves a window layout policy for the display device at operation 1707, then the controller 170 proceeds to operation 1709 at which the controller 170 determines that the found window layout policy corresponds to the window layout policy of the window to be display on the display device.

At operation 1711, the controller 170 applies the determined window layout policy to the window to be displayed on the display device.

At operation 1713, the controller 170 displays the window to which the window layout policy is applied on the display device. For example, the controller 170 generates the window according to the applicable window layout policy.

Conversely, if the controller 170 does not retrieve a window layout policy for the display device at operation 1707, then the controller 170 proceeds to operation 1715 at which the controller 170 determines that the default window layout policy corresponds to the window layout policy of the window to be displayed on the display device.

At operation 1717, the controller 170 applies the default window layout policy to the window to be displayed on the display device. Thereafter, the controller 170 proceeds to operation 1713 at which the controller 170 displays the window to which the window layout policy is applied on the display device.

Referring to FIG. 17, the controller 170 may determine whether any window layout policy of the display device on which the window is to be displayed when an application execution window is generated in response to the user request exists. If the window layout policy of the display device is retrieved, the controller 170 applies the retrieved window layout policy as the window layout policy of the display device. Otherwise, if no window layout policy is retrieved, the controller 170 applies the default window layout policy as the window layout policy of the display device. The controller 170 generates the window to which the window layout policy is applied and provides the application execution screen according to the layout of the window.

Figure 18:
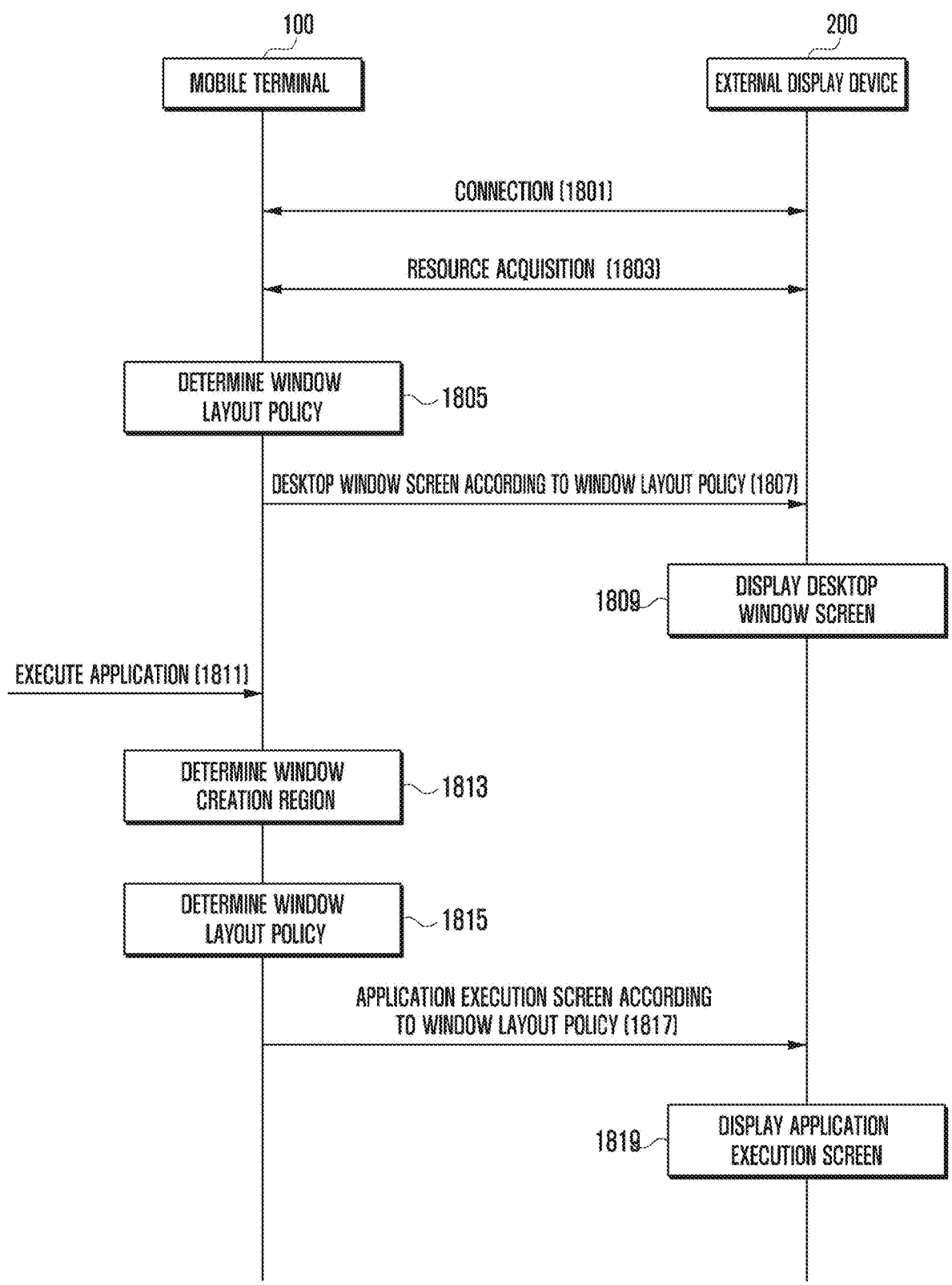
FIG. 18 is a signal flow diagram illustrating signal flows between a mobile terminal and an external display device interoperating in a method according to an embodiment of the present disclosure.

FIG. 18 is a signal flow diagram illustrating signal flows between a mobile terminal and an external display device interoperating in a method according to an embodiment of the present disclosure. FIGS. 19A, 19B, 19C, and 19D are diagrams illustrating screen displays of a mobile terminal and an external display device for explaining an interoperation there between.

Referring to FIGS. 18, 19A, 19B, 19C, and 19D, at operation 1801, the mobile terminal 100 is connected to the external display device 200. For example, the mobile terminal 100 may detects the connection of the external display device 200 through a wired (e.g., HDMI) link or a wireless (e.g., Wi-Fi) link in a certain operation mode (e.g., standby mode and application execution mode).

If the external display device 200 is connected to the mobile terminal 100 at operation 1801, then at operation 1803, the mobile terminal 100 acquires the resource of the external display device 200. For example, if the external display device 200 is connected, the mobile terminal 100 acquires the resource such as screen size of the external device 200. The resource of the external display device 200 may be provided in such a way that the mobile terminal 200 request the connected external display device 200 to transmit the resource and the external display device 200 provides the mobile terminal 100 with its resource in response to the resource transmission request. The external display device 200 may transmit the resource thereof to the mobile terminal automatically when the external display device 200 is connected to the mobile terminal 100. According to various embodiments of the present disclosure, the resource of the external display device is acquired in the way of polling or pushing the resource at the time when the mobile terminal 100 is connected to the external display device 200, the resource including the screen size of the external display device 200. The mobile terminal 100 may buffer or store the acquired resource in the storage unit 150 of the mobile terminal 100.

At this time, the host providing the resource may be a slave which does not perform any control function but provides screen data under the control of a master. The master may be the terminal 100 responsible for the control (particularly the controller 170), and the slave the external display device 200 and the display unit 130 of the mobile terminal 100 that display the screen data provided by the mobile terminal 100.

At operation 1805, the mobile terminal 100 determines the window layout policy corresponding to the resource acquired from the external display device 200. For example, the mobile terminal 100 may determine the window layout policy corresponding to the acquired resource by referencing the predetermined mapping table of the per-display device window layout policies.

At operation 1807, the mobile terminal 100 outputs the desktop window screen (e.g., background screen) to the external display device 200 according to the determined window layout policy. When displaying the desktop window screen, the mobile terminal 100 transfers the desktop window screen generated internally according to the window layout policy to the external display device 200 in the state of the current display of the mobile terminal 100 (e.g., current operation mode screen display).

Figure 19A:
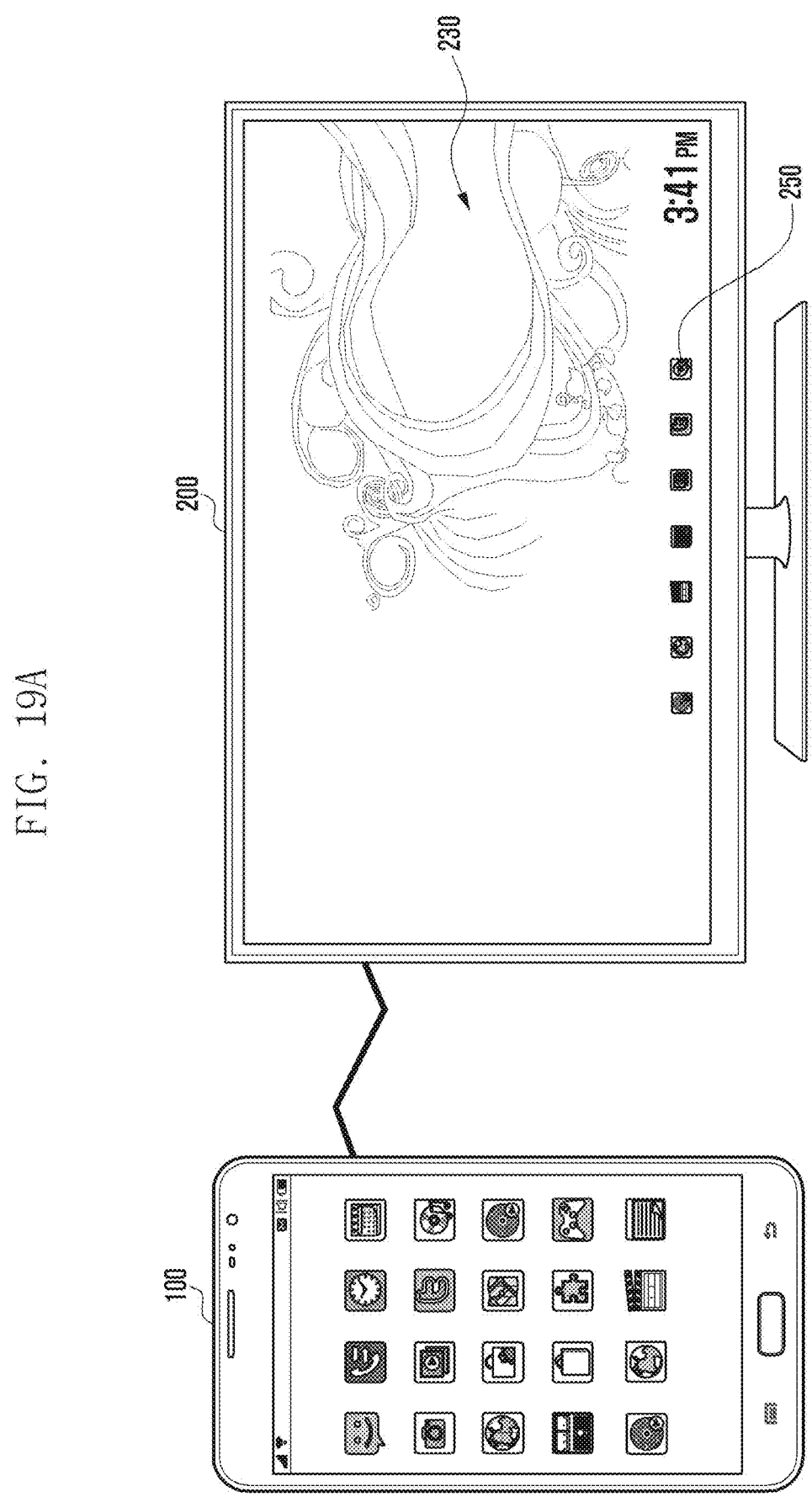
FIGS. 19A, 19B, 19C, and 19D are diagrams illustrating screen displays of a mobile terminal and an external display device for explaining an interoperation there between according to an embodiment of the present disclosure.

After being connected to the mobile terminal 100, if the desktop window screen is received from the mobile terminal 100, then at operation 1809, the external display device 200 displays the desktop window screen. As illustrated in FIG. 19A, the desktop window screen may include the desktop shortcut icons 250 representing the pre-registered applications so as to execute operation with the window corresponding to the resource of the predetermined background screen 230 and the external display device 200.

In the state in which the external display device 200 is connected to the mobile terminal 100, at operation 1811, the mobile terminal may receive a user input for executing an application. For example, the user may select an icon representing a specific application on the screen (e.g., a current screen of the mobile terminal 100 in FIG. 19A) displayed currently on the display device (e.g., display unit 130) of the mobile terminal 100 by manipulating the mobile terminal 100. The user also may manipulate the mobile terminal 100 to select an icon of a specific application (e.g., shortcut icon 250 for desktop) on the currently displayed screen of the external display device 200 (e.g., desktop window screen currently displayed on the external display device 200 in FIG. 19A).

At operation 1813, the mobile terminal 100 determines the window creation region for the application in response to the application execution request. For example, if an application execution request is detected, the mobile terminal 100 may determine the display device on which the application execution screen is to be displayed. For example, if the application execution request is detected on the currently display screen of the mobile terminal 100, the mobile terminal 100 may determine that the window creation region is the display device of the mobile terminal 100 (e.g., the display unit 130), and if the application execution request is detected on the currently displayed screen of the external display device 200, the mobile terminal may determine that the window creation region is the external display device 200. Although the application execution request is detected on the screen of the mobile terminal 100 in the state in which at least one external display device 200 is connected, the external display device 200 may be determined as the window creation region. The determination that the window creation region corresponds to the external display device 200 may depend on the user configuration.

If the window creation region is determined, then at operation 1815, the mobile terminal 100 determines the window layout policy corresponding to the display device as the window creation region. For example, the mobile terminal 100 may reference the mapping table of the per-display device window layout policies to select the window layout policy corresponding to the resource of the display device as the window creation region (e.g., display unit 130 of the mobile terminal 100 and external display device 200).

FIG. 18 is directed to the case in which the window creation region for the executed application is the external display device 200.

At operation 1817, the mobile terminal 100 outputs the application execution screen corresponding to the determined window layout policy to the external display device 200. For example, the mobile terminal 100 configures the window layout of the executed application according to the determined window layout policy and outputs the application execution screen corresponding to the window layout to which the window layout policy has been applied. For example, the mobile terminal 100 determines the application represented by the icon 250 selected by the user among the icons 250 displayed on the external display device 200. The mobile terminal 100 configures the application execution window with the layout according to the determined window layout policy and transfers the application execution screen to the external display device 200. For example, the mobile terminal 100 may execute the application with the layout corresponding to the resource of the display device (e.g., the external display device 200) in determining the external display device 200 as the application window creation region and process the screen display.

Figure 19B:
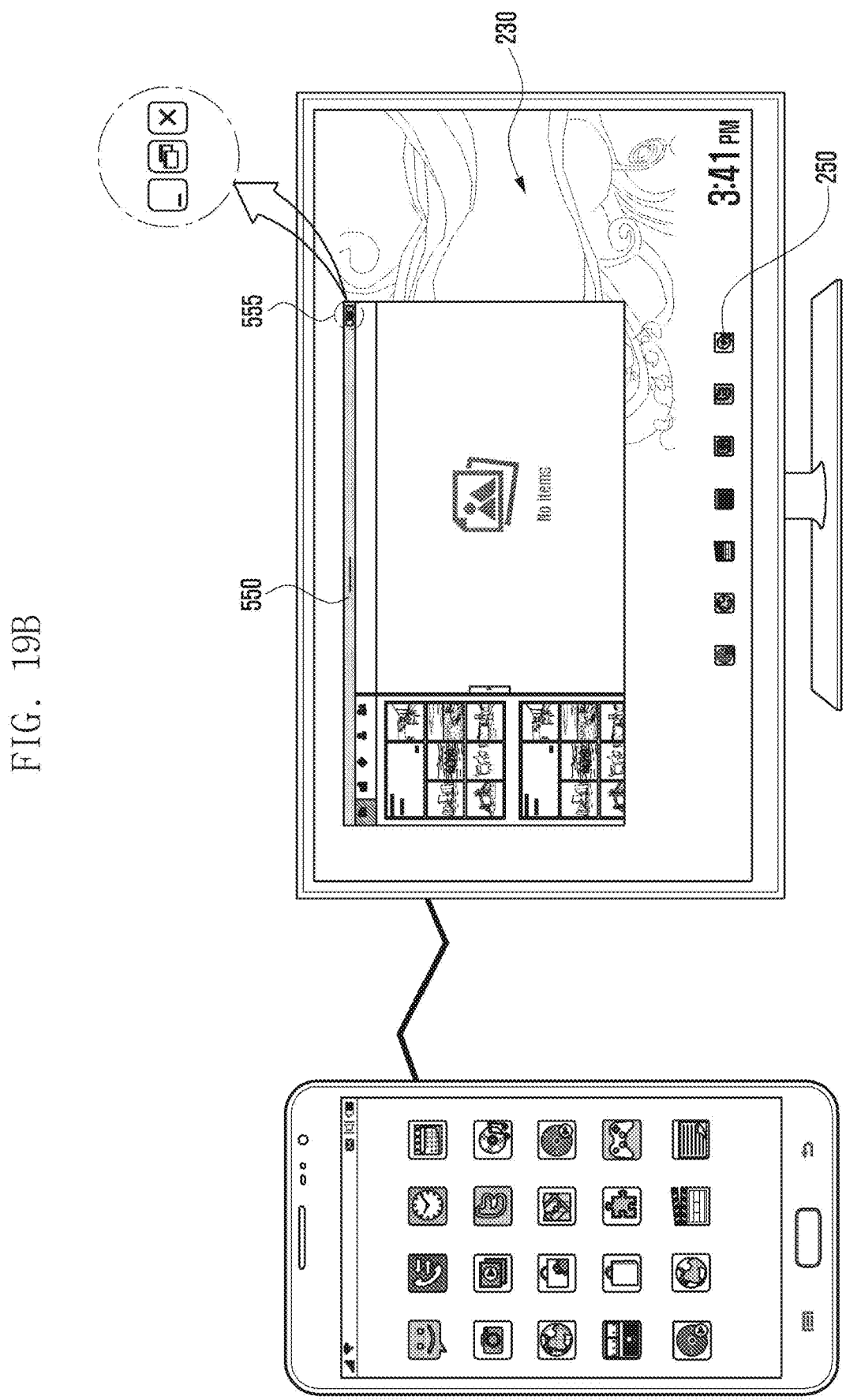

If the application execution screen is received from the mobile terminal 100 at operation 1817, then at operation 1819, the external display device 200 displays the application execution screen. The application execution screen is provided in the form of a window screen having the layout fit for the resource of the external display device 200 different from the window screen displayed on the display device (e.g., display unit 130) of the mobile terminal 100 as shown in FIG. 19B. For example, the application execution screen may be implemented in the form of desktop window layout according to the resource of the external display device 200. Referring to FIG. 19B, the desktop window may have the size larger than that displayed on the mobile terminal 100 along with detailed information. The further supplementary information may be provided at the top side of the frame of the window. The status bar 550 may present the status information (e.g., application name) on the corresponding window (e.g., execution screen). Particularly, the status bar 550 may include the window size adjustment buttons 555 such as executed window minimization and maximization, and window close buttons. At this time, the mobile terminal 100 may maintain the screen in the current state thereof. Further, the desktop window screen may include the desktop shortcut icons 250 representing the pre-registered applications so as to execute operation with the window corresponding to the resource of the predetermined background screen 230 and the external display device 200.

Figure 19C:
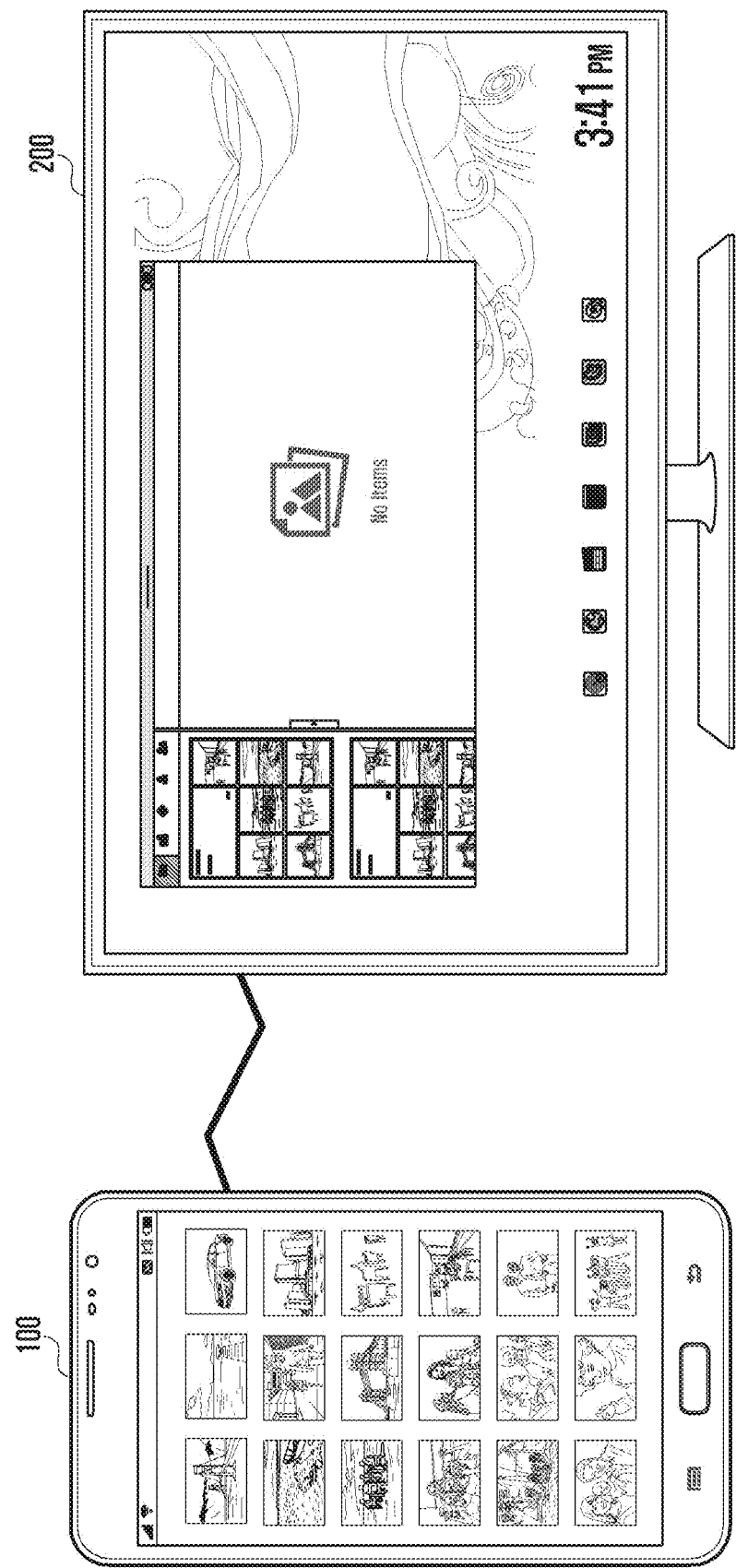

FIG. 19C is a diagram illustrating screen displays of the mobile terminal and the external display device with distinct window layouts according to an embodiment of the present disclosure.

As shown in FIG. 19C, the system is configured with the mobile terminal 100 supporting multi-screen function in connection with the external display device 200 displaying the screen output by the mobile terminal 100 in the window layout determined according to the per-display device window layout policy.

In FIG. 19C, the mobile terminal 100 and the external display device 200 are connected to each other through a wired interface (e.g., HDMI) or a wireless interface (e.g., Wi-Fi). The mobile terminal 100 transmits various screen data to the external display device 200 through the wired interface (e.g., HDMI) or the wireless interface (e.g., Wi-Fi).

In FIG. 19C, a certain application is executed with the execution screen which is displayed by the external display device 200 according to the external display device-specific window layout policy and by the internal display device of the mobile terminal 100 (e.g., display unit 130) according to the mobile terminal-specific window layout policy under the control of the mobile terminal 100

Referring to FIG. 19C, the mobile terminal in the state of being connected to the external display device 200 may provide the external display device 200 with the application execution screen to which the window layout policy corresponding to the resource of the external display device is applied and provide the display unit 130 of the mobile terminal 100 with the application execution screen to which the window layout policy corresponding to the resource of the display unit 130 of the mobile terminal (e.g., default window layout policy). For example, the application execution screen may be provided in different window layouts determined according to the display device-specific window layout policies.

If an application execution request is detected on the region of the external display device 200, the mobile terminal executes the application in the window format based on the window layout policy matching the resource of the external display device 200 and processes the output of the corresponding window. If the application execution request is detected on the region of the display unit 130 of the mobile terminal 100, the mobile terminal 100 executes the application in the window format based on the window layout policy matching the resource of the display unit 130 and processes the out of the corresponding window. In the case of generating the window according to the application execution at the external display device 200, the mobile terminal 100 formats the application execution screen in match with the resource of the external display device 200. In the case of generating the window according to the application execution at the mobile terminal 100, the mobile terminal 100 formats the application execution screen in match with the resource of the display unit 130.

Figure 19D:
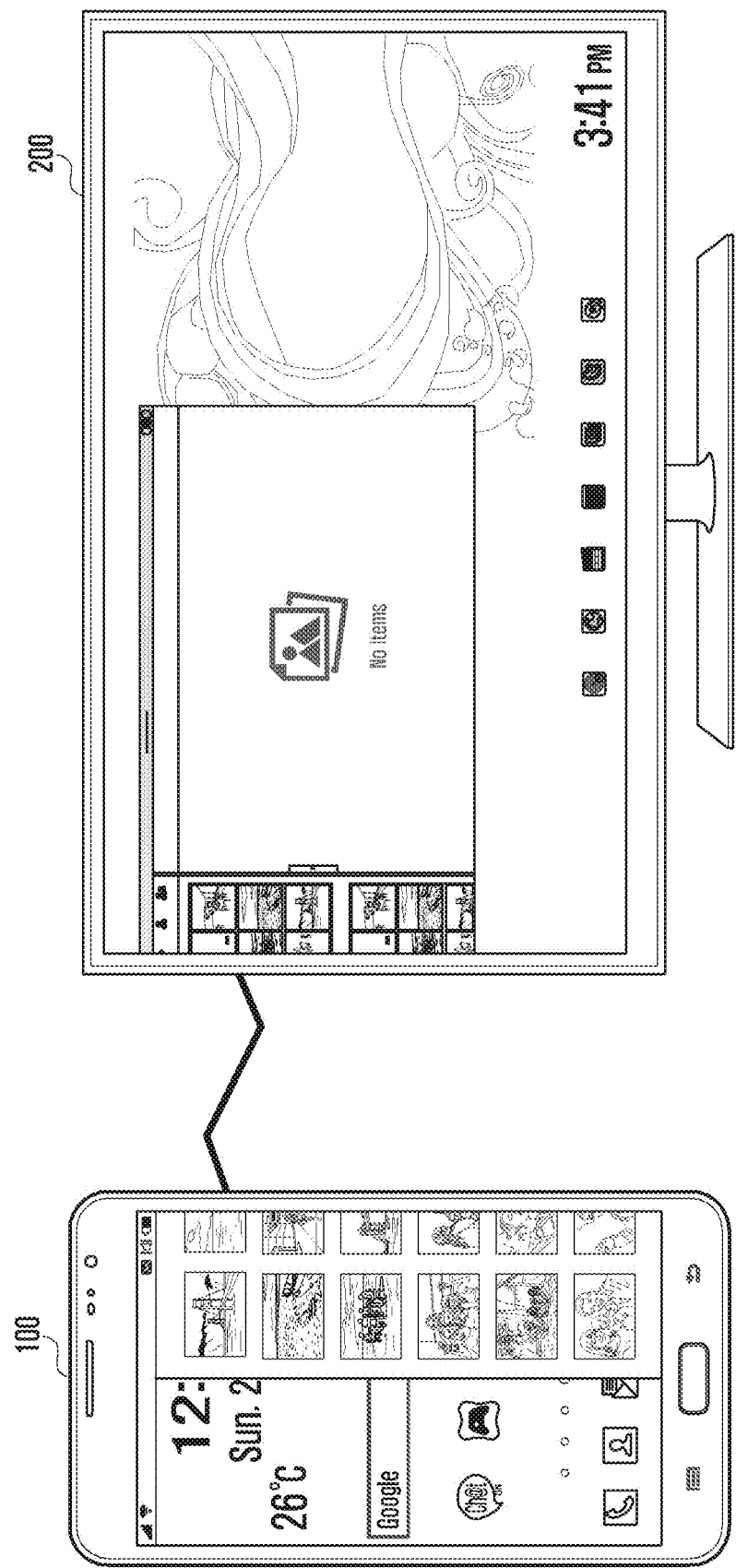

FIG. 19D is a diagram illustrating screen displays of the mobile terminal and the external display device with distinct window layouts according to an embodiment of the present disclosure.

FIG. 19D shows the screen displays in the state in which the mobile terminal 100 and the external display device 200 are connected through a wired link (e.g., HDMI) or a wireless link (e.g., Wi-Fi) and the execution screen of a certain application is displayed across the region of the mobile terminal 100 and the region of the external display device 200. For example, in the state in which the application is executed with the execution window displayed on the region of the external display device 200, the application execution window is moved to the region of the mobile terminal 100 in response to the user's window move manipulation such that the application execution window appears partially on the region of the mobile terminal 100.

As shown in FIG. 19D, a part of the execution screen of an application may be displayed on the region of the mobile terminal 100 as formatted in the layout according to the window layout policy of the display unit 130 of the mobile terminal, while the other part of the execution screen is displayed on the region of the external display device 200 as formatted in the layout according to the window layout policy of the external display device 200. For example, the execution window of the same application may be display in distinct layouts depending on the display device-specific window layout. In a case of a photo gallery application, the application execution window for the external display device 200 may be displayed in the layout having a list of photos and detailed description of a selected photo (e.g., enlarged photo), and the application execution window for the mobile terminal 100 may be displayed in the layout having only the list of the photos.

Although not shown in FIG. 19D, the user may manipulate such that the application execution window is moved from the region of one display device to the region of the other display device completely. In this case, the application execution window may be changed in layout from the window layout policy of the old display device to the window layout policy of the new display device. For example, if the application execution window is moved from the region of the external display device 200 to the region of the mobile terminal 100 completely according to the user's manipulation, the application execution window may be formatted in the window layout according to the mobile terminal-specific window layout policy. In contrast, if the application execution window is moved from the region of the mobile terminal 100 to the region of the external display device 200 completely, the application execution window may be formatted in the window layout according to the external display device-specific window layout policy.

Descriptions are made of the various embodiments related to the display function of the external display device in response to the user input in detail hereinafter with reference to FIGS. 20 to 24.

Figure 20:
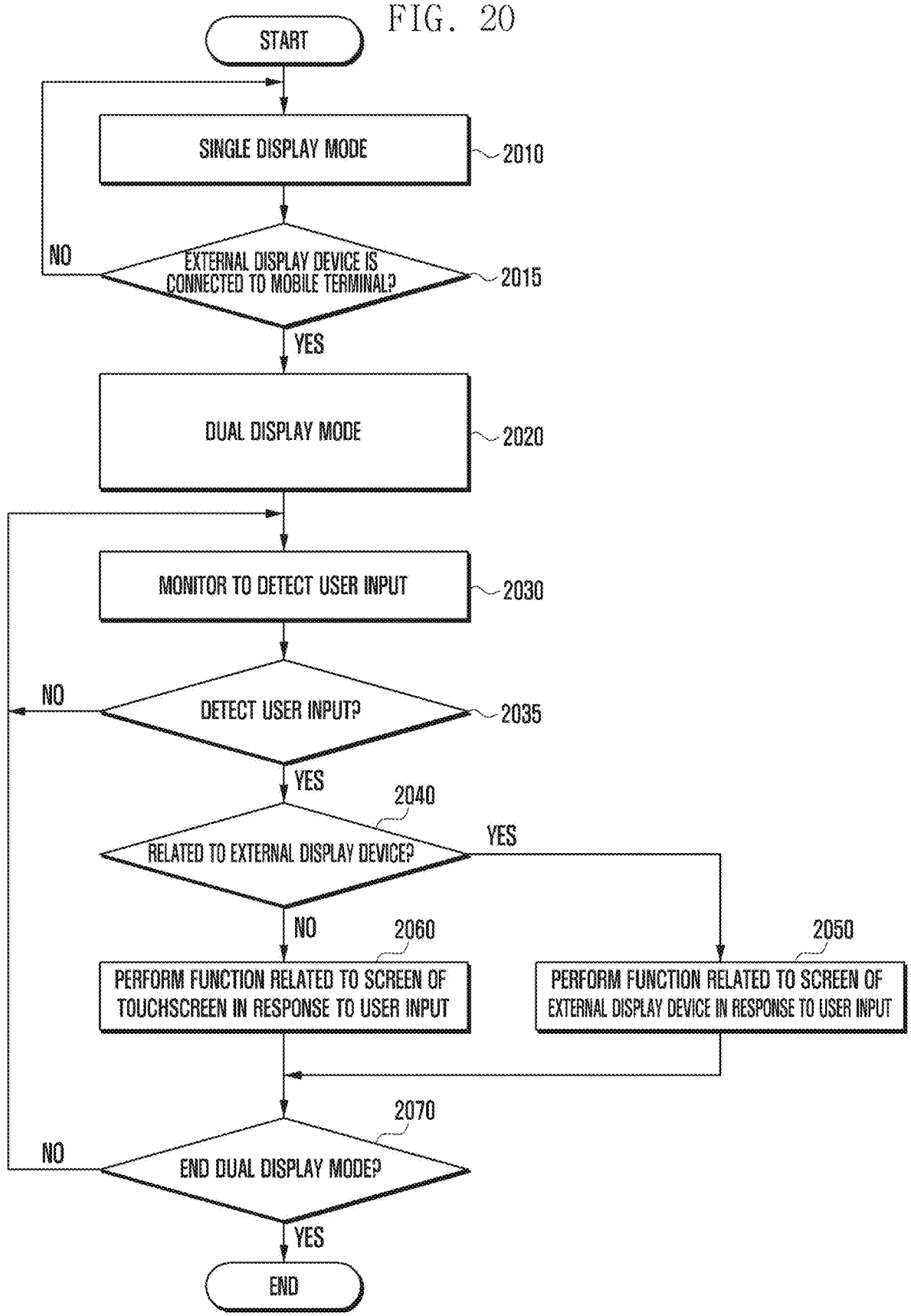
FIG. 20 is a flowchart illustrating a method for processing a user input according to an embodiment of the present disclosure.

FIG. 20 is a flowchart illustrating a method for processing a user input according to an embodiment of the present disclosure.

Referring to FIG. 20, at operation 2010, the controller 170 determines that the mobile terminal 100 is operating in the single display mode.

At operation 2015, the controller 170 determines whether any external display device is connected to the mobile terminal 100. For example, the external display device may be connected to the mobile terminal 100 through the radio communication unit or the interface unit 160.

If the controller 170 determines that an external display device is connected to the mobile terminal 100, then the controller 170 proceeds to operation 2020 at which the controller 170 controls the mobile terminal 100 to operate in the dual display mode. At operation 2020, if the external display device is connected to the mobile terminal 100, the controller 170 sends the external display device a message requesting for screen size information (e.g., resolution information). In response to the request, the external device sends the mobile terminal 100 a response message including the screen size information. The display unit 130 displays a first home screen including an icon of a virtual controller under the control of the controller 170. The external display device displays a second home screen under the control of the controller 170. At this time, the resolution of the second home screen is determined based on the screen size information received from the external display device. For example, the second home screen is formatted to match the screen size of the external display device. If the user makes a tap gesture to the icon of the virtual controller on the first home screen, the display unit 130 generates an input signal corresponding to the tap gesture to the controller 170. The controller 170 receives the input signal and executes the virtual controller in response to the input signal. The virtual controller requests the kernel to generate a virtual touchscreen. The kernel, particularly the U-input module, generates a virtual touchscreen for emulating the display unit 130 as the input device of the external display device. Meanwhile, the display unit 130 may display the execution screen of the virtual controller (e.g., emulation screen), under the control of the controller 170. At this time, the emulation screen includes a touch region. The emulation screen also may include at least one soft key (e.g., left mouse button, right mouse button, minimization button, maximization button, and close button). The emulation screen may be displayed in the form of an overlaid window. In addition, the emulation screen may be displayed on the second screen region while another screen is displayed in the first screen region. The emulation screen is closed in response to a user's request. If the user selects the corresponding icon on the first home screen, the emulation screen appears again. The virtual controller may be executed automatically when the external display device is connected to the mobile terminal 100. The auto-execution function may be turned on/off by the user. In the case in which the emulation screen is displayed, the controller 170 controls the external display device to display a pointer on the other screen (e.g., the second home screen) in the form of overlay. If the emulation screen function is terminated, the pointer disappears.

At operation 2030, the controller 170 monitors to detect a user input.

At operation 2035, the controller 170 determines whether a user input is detected on the display unit 130. The user input may be any of touch, multi-touch, tap, double tap, long tap, drag, flick, press, pinch-in, pinch-out, and/or the like.

If the controller determines that the user input is not detected on the display unit 130 at operation 2035, then the controller 170 proceeds to operation 2030.

If the controller 170 determines that the user input is detected on the display unit 130 at operation 2035, then the controller 170 proceeds to operation 2040 at which the controller 170 determines whether the user input is related to the external display device. For example, if no emulation screen is displayed, the controller 170 determines that the user input is not related to the external display device. Otherwise, if the emulation screen is displayed, the controller 170 determines that the user input is related to the external display device. If the user input is detected on the first screen region in the state in which the emulation screen is displayed on the first screen region and another screen is displayed on the second screen region, the controller 170 determines that the user input is related to the external display device. If the user input is detected on the second screen region, the controller 170 determines that the user input is not related to the external display device.

If the controller 170 determines that the user input is related to the external display device at operation 2040, then the controller proceeds to operation 2050 at which the controller 170 performs a function related to the screen of the external display device in response to the user input. For example, if a drag gesture is detected on the touch region of the emulation screen, the controller 170 moves the pointer in the drag direction. For example, the external display device shows the pointer in motion under the control of the controller 170. If a tap gesture is detected on the touch region of the emulation screen or a left mouse button is clicked in the state in which in pointer is placed on touch region, the controller 170 executes the application represented by the icon on which the pointer is placed and controls the external display device to display the execution screen. If the user input is the "tap & touch followed by drag," the controller 170 moves the pointer along with the execution window on which the pointer is placed. As described above with reference to operation 2050, the display unit 130 is used as the input device for the external display device.

If the controller 170 determines that the user input is not related to the screen of the external display device (e.g., if the user input is related to the screen of the display unit 130) at operation 2040, then the controller 170 proceeds to operation 2060 at which the controller 170 performs a function related to the screen of the display unit 130 in response to the user input. For example, if the user input is a drag, the controller 170 changes the screen according to the drag direction. For example, the first page of the first home screen may be replaced by the second page. If the user input is a tap, the controller 170 executes the application represented by the icon tapped and controls the display unit 130 to display the execution screen.

At operation 2070, the controller 170 determines whether a dual display mode termination request is input. For example, when the connection between the external display device and the mobile terminal 100 is released, the dual display mode is terminated. Otherwise, the controller 170 returns to operation 2030.

Figure 21:
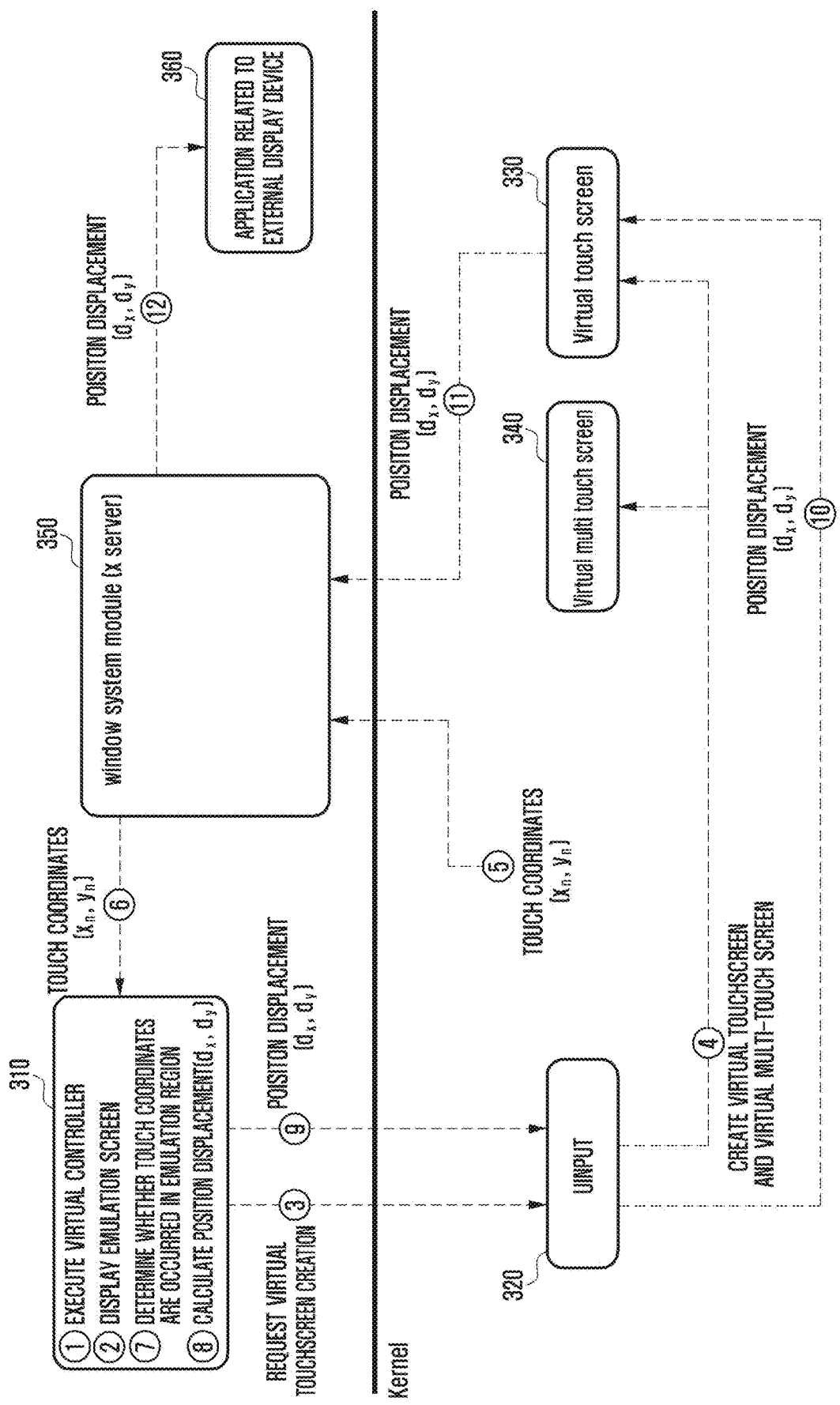
FIG. 21 is a diagram illustrating software architecture for explaining a procedure of moving a pointer on an external display device according to an embodiment of the present disclosure.
Figure 22:
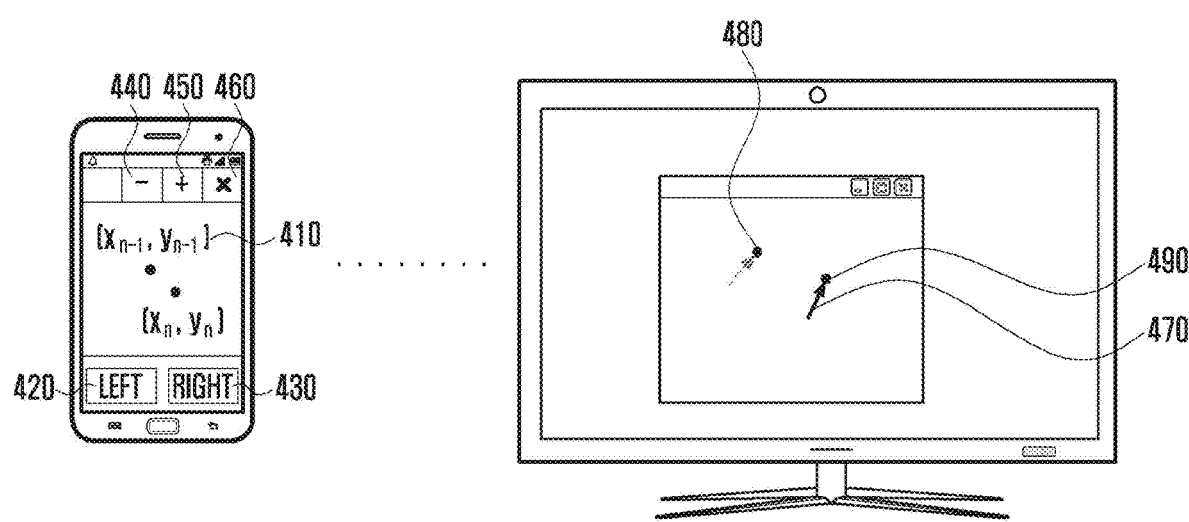
FIG. 22 is a diagram illustrating screen displays of a mobile terminal and an external display device for explaining a procedure of moving a pointer on an external display device according to an embodiment of the present disclosure.

FIG. 21 is a diagram illustrating software architecture for explaining a procedure of moving a pointer on an external display device according to an embodiment of the present disclosure. FIG. 22 is a diagram illustrating screen displays of a mobile terminal and an external display device for explaining a procedure of moving a pointer on an external display device according to an embodiment of the present disclosure.

Referring to FIG. 21, the controller 170 includes a virtual controller 310, a U-input module 320, a virtual touchscreen 330, a virtual multi-touchscreen 340, an Xserver 350, and an application 360.

At operation 1, the virtual controller 310 is executed.

At operation 2, the virtual controller 310 controls the display unit 130 to display an emulation screen including an emulation region 410, a left mouse button 420, a right mouse button 430, a minimization button 440, a maximization button 450, and an end button 460.

At operation 3, the virtual controller 310 transmits a request for a virtual touch screen creation to the U-input module 320.

At operation 4, the U-input module 320 creates a virtual touch screen and a virtual multi-touch touch screen.

At operation 5, the touch coordinates $(x_n, y_n)$ are transferred to the Xserver 350.

At operation 6, the Xserver 350 forwards the touch coordinates $(x_n, y_n)$ to the virtual controller 310.

At operation 7, the virtual controller 310 determines whether the $(x_n, y_n)$ is the coordinates of the emulation region 410.

If the touch coordinates $(x_n, y_n)$ are the coordinates of the emulation region 410, then at operation 8, the virtual controller 310 calculates the touch displacement $(d_x(x_n-x_{n-1}), d_y(y_n-y_{n-1}))$. $(x_{n-1}, y_{n-1})$ are the previously detected touch coordinates.

At operation 9, the virtual controller 310 sends the position displacement $(d_x, d_y)$ to the U-input module 320.

At operation 10, the U-input module 320 sends the position displacement $(d_x, d_y)$ to the virtual touchscreen 330.

At operation 11, the virtual touchscreen 330 sends the position displacement $(d_x, d_y)$ to the Xserver 350.

At operation 12, the Xserver 350 sends the position displacement $(d_x, d_y)$ to the application 360 associated with the external display device. The application moves the pointer 470 from the first position 480 to the second position 490 in response to the position displacement $(d_x, d_y)$ as shown in FIG. 22.

Figure 23:
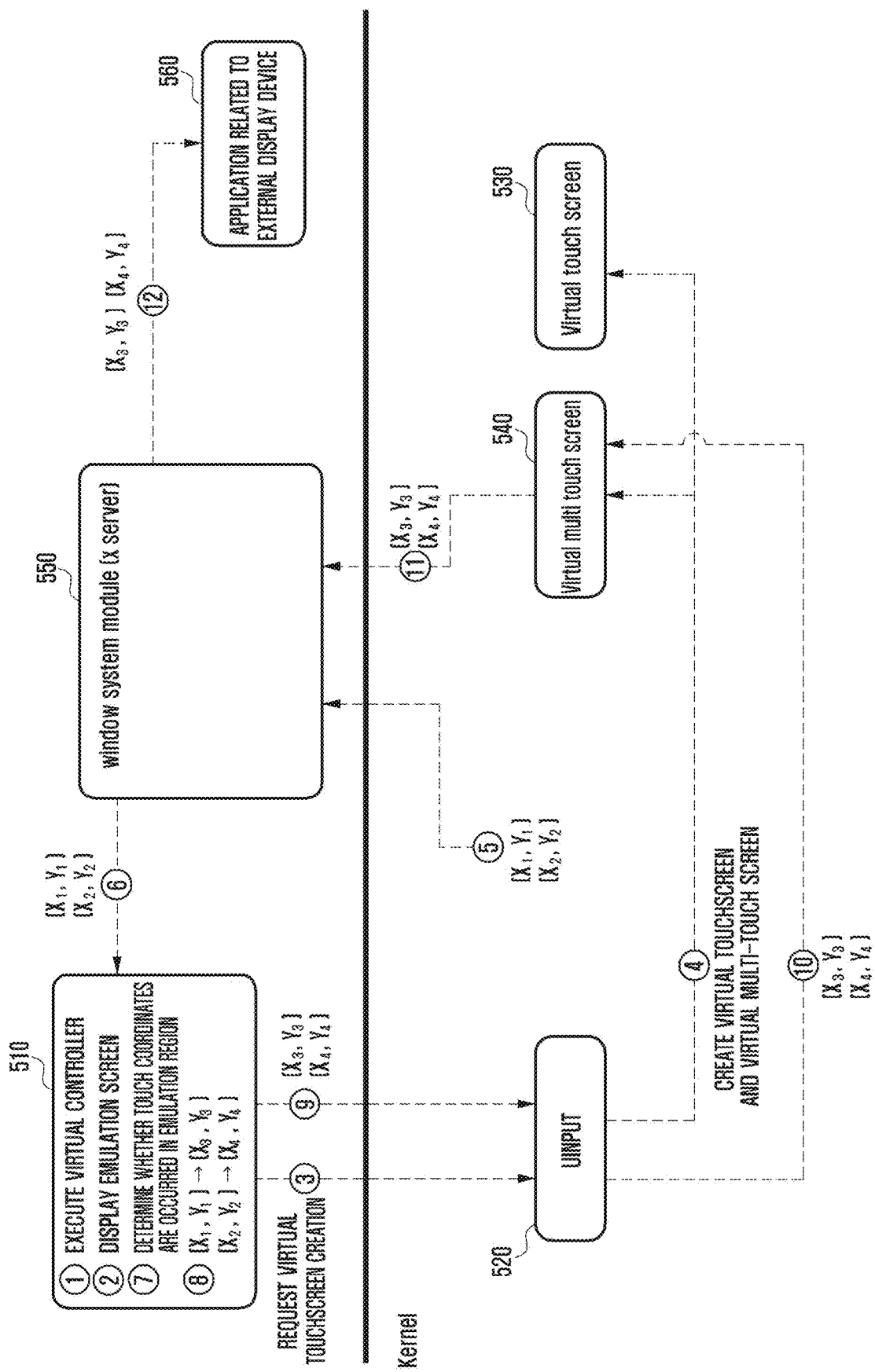
FIG. 23 is a diagram illustrating software architecture for explaining a procedure of changing a size of an image displayed on an external display device according to an embodiment of the present disclosure.
Figure 24:
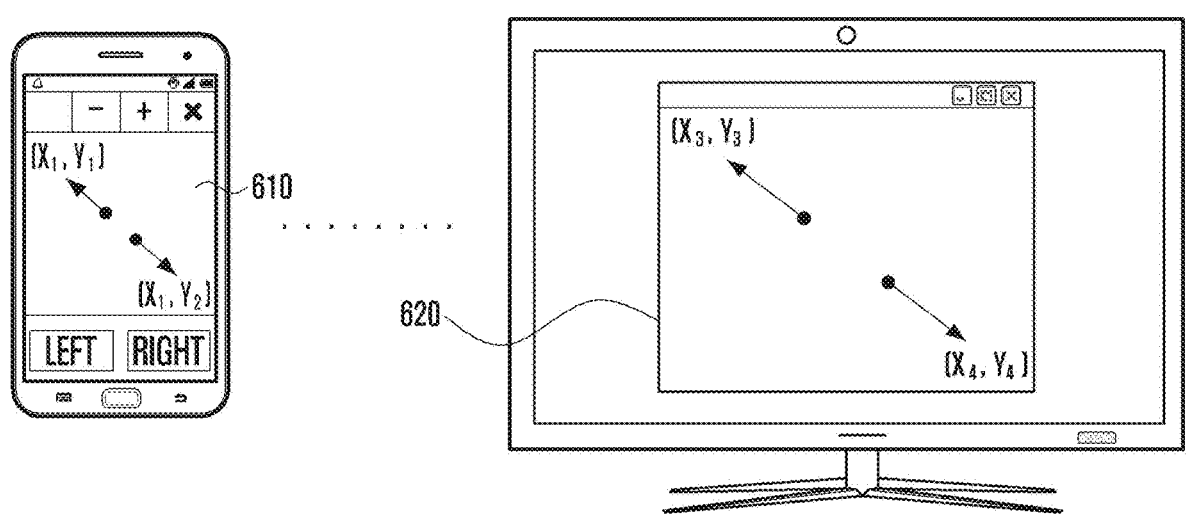
FIG. 24 is a diagram illustrating screen displays of a mobile terminal and an external display device for explaining a procedure of changing a size of an image displayed on an external display device according to an embodiment of the present disclosure.

FIG. 23 is a diagram illustrating software architecture for explaining a procedure of changing a size of an image displayed on an external display device according to an embodiment of the present disclosure. FIG. 24 is a diagram illustrating screen displays of a mobile terminal and an external display device for explaining a procedure of changing a size of an image displayed on an external display device according to an embodiment of the present disclosure.

Referring to FIG. 23, the controller 170 includes a virtual controller 510, a U-input module 520, a virtual touch screen 530, a virtual multi-touch screen 540, an Xserver 550, and an application 560.

Operations 1 to 4 of FIG. 23 are identical with those of FIG. 21.

At operation 5, the first touch coordinates (x1, y1) and the second touch coordinates (x2, xy) are sent to the Xserver 550.

At operation 6, the Xserver 550 sends the first and second touch coordinates (x1, y1) and (x2, y2) to the virtual controller 510.

At operation 7, the virtual controller 510 determines whether the first and second touch coordinates (x1, y1) and (x2, y2) are the coordinates in the emulation region 610.

If the first and second touch coordinates (x1, y1) and (x2, y2) are the coordinates in the emulation region 610, then at operation 8, the virtual controller 510 determines the size (A) of the emulation region 610 and the size (B) of the execution window 620 (see FIG. 6) and respectively converts the first and second touch coordinates (x1, y1) and (x2, y2) to the third and fourth touch coordinates (x3, y3) and (x4, y4).

At operation 9, the virtual controller 510 sends the third and fourth touch coordinates (x3, y3) and (x4, y4) to the U-input module 520.

At operation 10, the U-input module 520 sends the virtual multi-touchscreen 540 the third and fourth touch coordinates (x3, y3) and (x4, y4).

At operation 11, the virtual multi-touchscreen 540 sends the Xserver 550 the third and fourth touch coordinates (x3, y3) and (x4, y4).

At operation 12, the Xserver 550 sends the application related to the external display device the third and fourth touch coordinates (x3, y3) and (x4, y4). The application 560 changes (e.g., enlarges) the size of the execution window 620 based on the third and fourth touch coordinates (x3, y3) and (x4, y4).

As described above, according to various embodiments of the present disclosure, the desktop virtualization method and apparatus of the mobile terminal provide a desktop virtualization function capable of allowing the mobile terminal to perform desktop environment operation in interoperation with the an external display device. Accordingly, the desktop virtualization method and apparatus according to various embodiments of the present disclosure are capable of providing the user with the desktop window environment for presenting more information and meeting various user requirements. According to various embodiments of the present disclosure, the desktop virtualization method and apparatus are capable resolving the inconvenience caused by the size-constrained screen of the mobile device and allowing the user to use the mobile terminal in the desktop environment on the large screen of the connected external display device.

According to various embodiments of the present disclosure, the desktop virtualization method and apparatus are capable of providing an optimized desktop window environment to the mobile terminal user so as to improve the user convenience and usability and competitiveness of the mobile terminal. According to various embodiments of the present disclosure, the desktop virtualization method and apparatus are applicable to all the types of the mobile terminals and equivalent devices supporting multi-screen function.

According to various embodiments of the present disclosure, the per-display device window layout provision method and apparatus of the mobile terminal are capable of providing the user with the screen display in various window layouts fit for various display devices. According to various embodiments of the present disclosure, the method and apparatus are capable of providing the display device-specific screen layouts so as to improve the user convenience.

According to various embodiments of the present disclosure, the per-display device window layout provision method and apparatus of the present disclosure are capable of configuring distinct window layout policies corresponding to at least two display devices such that an application is executed the execution screen of an application is formed in the display device-specific window layout according to the window layout policy matching the display device. According to various embodiments of the present disclosure, the method and apparatus are capable resolving the inconvenience caused by the size-constrained screen of the mobile device and allowing the user to use the mobile terminal in the desktop environment on the large screen of the connected external display device.

According to various embodiments of the present disclosure, the method and apparatus are capable of providing optimal environment for displaying the screen in the format matching the display device so as to improve the user convenience and usability and competitiveness of the mobile terminal. According to various embodiments of the present disclosure, the method and apparatus are applicable to all the types of the mobile terminals and equivalent devices supporting multi-screen function.

According to various embodiments of the present disclosure, the user input processing method and apparatus of the mobile terminal interoperating with an external display device are capable of providing the user with a dual display mode environment without extra external input device. According to various embodiments of the present disclosure, the method and apparatus are capable of providing the user with the dual screen mode environment using a touchscreen of the mobile terminal and an external display device.

The above-described various embodiments of the present disclosure can be implemented in the form of computer-executable program commands and stored in a non-transitory computer-readable storage medium. The non-transitory computer readable storage medium may store the program commands, data files, and data structures in individual or combined forms. The program commands recorded in the storage medium may be designed and implemented for various embodiments of the present disclosure or used by those skilled in the computer software field.

The non-transitory computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, flash memory, and the like. The programs commands include the language code executable by computers using the interpreter as well as the machine language codes created by a compiler. The aforementioned hardware device can be implemented with one or more software modules for executing the operations of the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal comprising:
a communication interface configured to communicatively connect to an electronic device;
a display; and
a controller configured to:
while the mobile terminal is communicatively connected to the electronic device via the communication interface, transmit information related to a desktop window screen via the communication interface, to the electronic device,
while the mobile terminal is communicatively connected to the electronic device via the communication interface, and while the electronic device is displaying, based on the transmitted information related to the desktop window screen, the desktop window screen including a plurality of icons corresponding to a plurality of applications configured to execute on the mobile terminal and to execute in a desktop window environment, transmit, via the communication interface to the electronic device, based on a first user input selecting one icon related to a gallery application among the plurality of icons, a plurality of images in a first layout having first rows and first columns of individual images of the plurality of images in a first size corresponding to pictures stored at the mobile terminal, the plurality of images being included in a first gallery list related to the gallery application corresponding to the selected one icon, that is displayed by the electronic device,
while the mobile terminal is communicatively connected to the electronic device via the communication interface, transmit, based on a second user input selecting one of the plurality of images in the first gallery list while the electronic device is displaying the plurality of images in a first execution screen of the gallery application corresponding to the selected one icon that includes first user selectable window adjustment buttons for minimizing, maximizing, and closing the first execution screen, which is displayed via the desktop window screen while the plurality of icons are displayed, an image in a second size corresponding to the selected one of the plurality of images included in the first gallery list, via the communication interface to the electronic device, wherein the image in the second size is displayed by the electronic device in the first execution screen of the gallery application corresponding to the selected one icon that includes the first user selectable window adjustment buttons for minimizing, maximizing, and closing the first execution screen, which is displayed via the desktop window screen while the plurality of icons are displayed, and
while the mobile terminal is communicatively connected to the electronic device via the communication interface, and based on a third user input moving the first gallery list off the desktop window screen, display on a mobile terminal screen displayed on the display a second part of a second gallery list of the plurality of images displayed in a second layout that is different than the first layout and has second rows and second columns of the individual images of the plurality of images, the second part of the second gallery list of the plurality of images corresponding to a first part of the first gallery list not displayed on the desktop window screen based on the third user input, the second part of the second gallery list of the plurality of images being displayed on a second execution screen without second user selectable window adjustm ent buttons for minimizing, maximizing, and closing the second execution screen, and the second part of the second gallery list of the plurality of images being displayed on the mobile terminal screen while the first part of the first gallery list of the plurality of images is displayed on the desktop window screen, wherein the second size is larger than the first size, and wherein, while the mobile terminal is communicatively connected to the electronic device via the communication interface, the mobile terminal screen displayed on the display and the desktop window screen displayed by the electronic device are different.

2. The mobile terminal of claim 1, wherein the communication interface is configured to communicatively connect to the electronic device through a wired connection.

3. The mobile terminal of claim 1, wherein the electronic device is one of a laptop computer or a desktop computer.

4. A method by a mobile terminal, the method comprising:

while the mobile terminal is communicatively connected to an electronic device via a communication interface of the mobile terminal, transmitting information related to a desktop window screen, via the communication interface, to the electronic device;

while the mobile terminal is communicatively connected to the electronic device via the communication interface, and while the electronic device is displaying, based on the transmitted information related to the desktop window screen, the desktop window screen including a plurality of icons corresponding to a plurality of applications configured to execute on the mobile terminal and to execute in a desktop window environment, transmitting, via the communication interface to the electronic device, based on a first user input selecting one icon related to a gallery application among the plurality of icons, a plurality of images in a first layout having first rows and first columns of individual images of the plurality of images in a first size corresponding to pictures stored at the mobile terminal, the plurality of images being included in a first gallery list related to the gallery application corresponding to the selected one icon, that is displayed by the electronic device;

while the mobile terminal is communicatively connected to the electronic device via the communication interface, transmitting, based on a second user input selecting one of the plurality of images in the first gallery list while the electronic device is displaying the plurality of images in a first execution screen of the gallery application corresponding to the selected one icon that includes first user selectable window adjustment buttons for minimizing, maximizing, and closing the first execution screen, which is displayed via the desktop window screen while the plurality of icons are displayed, an image in a second size corresponding to the selected one of the plurality of images included in the first gallery list, via the communication interface to the electronic device, wherein the image in the second size is displayed by the electronic device in the first execution screen of the gallery application corresponding to the selected one icon that includes the first user selectable window adjustment buttons for minimizing, maximizing, and closing the first execution screen, which is displayed via the desktop window screen while the plurality of icons are displayed; and while the mobile terminal is communicatively connected to the electronic device via the communication interface, and based on a third user input moving the first gallery list off the desktop window screen, displaying on a mobile terminal screen displayed on the display a second part of a second gallery list of the plurality of images displayed in a second layout that is different than the first layout and has second rows and second columns of the individual images of the plurality of images, the second part of the second gallery list of the plurality of images corresponding to a first part of the first gallery list not displayed on the desktop window screen based on the third user input, the second part of the second gallery list of the plurality of images being displayed on a second execution screen without second user selectable window adjustment buttons for minimizing, maximizing, and closing the second execution screen, and the second part of the second gallery list of the plurality of images being displayed on the mobile terminal screen while the first part of the first gallery list of the plurality of images is displayed on the desktop window screen, wherein the second size is larger than the first size, and wherein, while the mobile terminal is communicatively connected to the electronic device via the communication interface, the mobile terminal screen displayed on the display and the desktop window screen displayed by the electronic device are different.

5. The method of claim 4, wherein the communication interface is configured to communicatively connect to the electronic device through a wired connection.

6. The method of claim 4, wherein the electronic device is one of a laptop computer or a desktop computer.

7. An electronic device comprising:

a communication interface configured to communicatively connect to a mobile terminal;

a display; and a controller configured to:

while the electronic device is communicatively connected to the mobile terminal via the communication interface, receive information related to a desktop window screen, via the communication interface from the mobile terminal, control to display, on the display based on the received information related to the desktop window screen, the desktop window screen including a plurality of icons corresponding to a plurality of applications configured to execute on the mobile terminal and to execute in a desktop window environment, receive, based on a first user input selecting one icon related to a gallery application among the plurality of icons, a plurality of images in a first layout having first rows and first columns of individual images of the plurality of images in a first size corresponding to pictures stored at the mobile terminal, the plurality of images being included in a first gallery list related to the gallery application corresponding to the selected one icon, via the communication interface from the mobile terminal, control to display, on the display, the received plurality of images in a first execution screen of the gallery application corresponding to the selected one icon that includes first user selectable window adjustment buttons for minimizing, maximizing, and closing the first execution screen, which is displayed via the desktop window screen while the plurality of icons are displayed, the plurality of images corresponding to the pictures stored at the mobile terminal, receive, based on a second user input selecting one of the plurality of images, an image in a second size corresponding to the selected one of the plurality of images in the first gallery list, via the communication interface from the mobile terminal, control to display, on the display in the first execution screen of the gallery application corresponding to the selected one icon that includes the first user selectable window adjustment buttons for minimizing, maximizing, and closing the first execution screen, which is displayed via the desktop window screen while the plurality of icons are displayed, the received image in the second size corresponding to the same picture stored at the mobile terminal that corresponds to the selected one of the plurality of images in the first gallery list in the first size on the desktop window screen, and control to display, on the display based on a third user input moving the first gallery list off the desktop window screen, the first gallery list without a first part thereof that corresponds to a second part of a second gallery list of the plurality of images displayed on a mobile terminal screen displayed on the mobile terminal, the second gallery list being displayed in a second layout that is different than the first layout and has second rows and second columns of the individual images of the plurality of images, the second part of the second gallery list of the plurality of images being displayed on a second execution screen without second user selectable window adjustment buttons for minimizing, maximizing, and closing the second execution screen, and the first part of the first gallery list of the plurality of images being displayed on the desktop window screen while the second part of the second gallery list of the plurality of images is being displayed on the mobile terminal screen, wherein the second size is larger than the first size, and wherein, while the electronic device is communicatively connected to the mobile terminal via the communication interface, the desktop window screen displayed on the display and the mobile terminal screen displayed on the mobile terminal are different.

8. The electronic device of claim 7, wherein the communication interface is configured to communicatively connect to the mobile terminal through a wired connection.

9. The electronic device of claim 7, wherein the electronic device is one of a laptop computer or a desktop computer.

10. A method by an electronic device, the method comprising:

while the electronic device is communicatively connected to a mobile terminal via a communication interface of the electronic device, receiving information related to a desktop window screen, via the communication interface from the mobile terminal;

displaying on a display of the electronic device, based on the received information related to the desktop window screen, the desktop window screen including a plurality of icons corresponding to a plurality of applications configured to execute on the mobile terminal and to execute in a desktop window environment;

receiving, based on a first user input selecting one icon related to a gallery application among the plurality of icons, a plurality of images in a first layout having first rows and first columns of individual images of the plurality of images in a first size corresponding to pictures stored at the mobile terminal, the plurality of images being included in a first gallery list related to the gallery application corresponding to the selected one icon, via the communication interface from the mobile terminal;

displaying, on the display, the received plurality of images in a first execution screen of the gallery application corresponding to the selected one icon that includes first user selectable window adjustment buttons for minimizing, maximizing, and closing the first execution screen, which is displayed via the desktop window screen while the plurality of icons are displayed, the plurality of images corresponding to the pictures stored at the mobile terminal;

receiving, based on a second user input selecting one of the plurality of images in the first gallery list, an image in a second size corresponding to the selected one of the plurality of images in the first size, via the communication interface from the mobile terminal;

displaying, on the display in the first execution screen of the gallery application corresponding to the selected one icon that includes the first user selectable window adjustment buttons for minimizing, maximizing, and closing the first execution screen, which is displayed via the desktop window screen while the plurality of icons are displayed, the received image in the second size corresponding to the same picture stored at the mobile terminal that corresponds to the selected one of the plurality of images in the first gallery list in the first size on the desktop window screen; and displaying, on the display based on a third user input moving the first gallery list off the desktop window screen, the first gallery list without a first part thereof that corresponds to a second part of a second gallery list of the plurality of images displayed on a mobile terminal screen displayed on the mobile terminal, the second gallery list being displayed in a second layout that is different than the first layout and has second rows and second columns of the individual images of the plurality of images, the second part of the second gallery list of the plurality of images being displayed on a second execution screen without second user selectable window adjustment buttons for minimizing, maximizing, and closing the second execution screen, and the first part of the first gallery list of the plurality of images being displayed on the desktop window screen while the second part of the second gallery list of the plurality of images is being displayed on the mobile terminal screen, wherein the second size is larger than the first size, and wherein, while the electronic device is communicatively connected to the mobile terminal via the communication interface, the desktop window screen displayed on the display and the mobile terminal screen displayed on the mobile terminal are different.

11. The method of claim 10, wherein the communication interface is configured to communicatively connect to the mobile terminal through a wired connection.

12. The method of claim 10, wherein the electronic device is one of a laptop computer or a desktop computer.

\* \* \* \* \*